United States Patent
Teramoto et al.

(10) Patent No.: US 12,338,516 B2
(45) Date of Patent: *Jun. 24, 2025

(54) DAMPER SPRING

(71) Applicants: NIPPON STEEL CORPORATION, Tokyo (JP); NIPPON STEEL SG WIRE CO., LTD., Tokyo (JP)

(72) Inventors: Shinya Teramoto, Tokyo (JP); Yutaka Neishi, Tokyo (JP); Michimasa Aono, Tokyo (JP); Shoichi Suzuki, Tokyo (JP); Tatsuro Ochi, Tokyo (JP)

(73) Assignees: NIPPON STEEL CORPORATION, Tokyo (JP); NIPPON STEEL SG WIRE CO., LTD., Tokyo (JP)

( * ) Notice: Subject to any disclaimer, the term of this patent is extended or adjusted under 35 U.S.C. 154(b) by 392 days.

This patent is subject to a terminal disclaimer.

(21) Appl. No.: 17/904,445

(22) PCT Filed: Feb. 19, 2021

(86) PCT No.: PCT/JP2021/006398
§ 371 (c)(1),
(2) Date: Aug. 17, 2022

(87) PCT Pub. No.: WO2021/167072
PCT Pub. Date: Aug. 26, 2021

(65) Prior Publication Data
US 2023/0081462 A1 Mar. 16, 2023

(30) Foreign Application Priority Data
Feb. 21, 2020 (JP) .................. 2020-027779

(51) Int. Cl.
*C22C 38/34* (2006.01)
*C22C 38/04* (2006.01)
(Continued)

(52) U.S. Cl.
CPC .............. *C22C 38/34* (2013.01); *C22C 38/04* (2013.01); *C22C 38/22* (2013.01); *C22C 38/24* (2013.01);
(Continued)

(58) Field of Classification Search
None
See application file for complete search history.

(56) References Cited

U.S. PATENT DOCUMENTS

| 6,193,816 B1 | 2/2001 | Nakano et al. |
| 6,372,056 B1 | 4/2002 | Kuroda et al. |

(Continued)

FOREIGN PATENT DOCUMENTS

| DE | 29622242 U1 | 6/1997 |
| DE | 69807155 T2 | 12/1998 |

(Continued)

*Primary Examiner* — Jenny R Wu
(74) *Attorney, Agent, or Firm* — Greer, Burns & Crain, Ltd.

(57) ABSTRACT

A damper spring which has an excellent fatigue limit is provided. A chemical composition of the damper spring according to the present embodiment contains in mass %, C: 0.50 to 0.80%, Si: 1.20 to less than 2.50%, Mn: 0.25 to 1.00%, P: 0.020% or less, S: 0.020% or less, Cr: 0.40 to 1.90%, V: 0.05 to 0.60%, and N: 0.0100% or less, with the balance being Fe and impurities. In the damper spring, a number density of V-based precipitates having a maximum diameter ranging from 2 to 10 nm is 5000 to 80000 pieces/$\mu m^3$.

4 Claims, 2 Drawing Sheets

(51) Int. Cl.
*C22C 38/22* (2006.01)
*C22C 38/24* (2006.01)
*C22C 38/26* (2006.01)
*C22C 38/28* (2006.01)
*C22C 38/30* (2006.01)
*C22C 38/32* (2006.01)
*C22C 38/42* (2006.01)

(52) U.S. Cl.
CPC .............. *C22C 38/26* (2013.01); *C22C 38/28* (2013.01); *C22C 38/30* (2013.01); *C22C 38/32* (2013.01)

(56) References Cited

U.S. PATENT DOCUMENTS

| | | |
|---|---|---|
| 2006/0060269 A1 | 3/2006 | Nakano et al. |
| 2008/0279714 A1 | 11/2008 | Hashimura et al. |
| 2009/0293998 A1 | 12/2009 | Fujino et al. |
| 2013/0285299 A1 | 10/2013 | Kuno et al. |

FOREIGN PATENT DOCUMENTS

| | | | |
|---|---|---|---|
| DE | 19852734 A1 | 8/1999 | |
| DE | 69923934 T2 | 12/2005 | |
| DE | 102010046776 A1 | 7/2011 | |
| DE | 112004000474 B4 | 2/2013 | |
| DE | 112011104680 T5 | 10/2013 | |
| JP | 02057637 A | 2/1990 | |
| JP | 2006183137 A | 7/2006 | |
| JP | 2007302950 A | 11/2007 | |
| JP | 2010163689 A | 7/2010 | |
| JP | 2018003051 A * | 1/2018 | |
| WO | WO-2017169667 A1 * | 10/2017 | ............... C21D 8/06 |

* cited by examiner

DAMPER SPRING

TECHNICAL FIELD

The present disclosure relates to a spring, and more specifically relates to a damper spring that absorbs an impact or vibrations from the outside.

BACKGROUND ART

Many springs are utilized in automobiles and general machinery. Among the springs used in automobiles and general machinery, damper springs have an action that absorbs an impact or vibrations from the outside. A damper spring is used, for example, in a torque converter that transmits the motive power of an automobile to the transmission. In a case where a damper spring is used in a torque converter, the damper spring absorbs vibrations of an internal combustion engine (e.g., an engine) of the automobile.

Because there is a need for a damper spring to have a function that absorbs an impact or vibrations from the outside, it is necessary for a damper spring to have a high fatigue limit. One example of a method for producing a damper spring is as follows. A quenching and tempering treatment is performed on a steel wire. The steel wire after the quenching and tempering treatment is subjected to cold coiling to form an intermediate steel material in a coil shape. The intermediate steel material is subjected to stress relief annealing treatment. After the stress relief annealing treatment, as necessary, nitriding is performed. That is, nitriding may be performed, or need not be performed. After the stress relief annealing treatment, or after the nitriding, as necessary, shot peening is performed to impart compressive residual stress to the outer layer. A damper spring is produced by the above process.

Recently, there is a demand for further improvements in the fatigue limit of damper springs.

Techniques relating to improving the fatigue limit of springs are disclosed in Japanese Patent Application Publication No. 2-57637 (Patent Literature 1), Japanese Patent Application Publication No. 2010-163689 (Patent Literature 2), Japanese Patent Application Publication No. 2007-302950 (Patent Literature 3), and Japanese Patent Application Publication No. 2006-183137 (Patent Literature 4).

A steel wire for a spring having a high fatigue limit disclosed in Patent Literature 1 is produced by subjecting a steel having a chemical composition containing, in wt %, C: 0.3 to 1.3%, Si: 0.8 to 2.5%, Mn: 0.5 to 2.0% and Cr: 0.5 to 2.0%, and containing one or more types of element among Mo: 0.1 to 0.5%, V: 0.05 to 0.5%, Ti: 0.002 to 0.05%, Nb: 0.005 to 0.2%, B: 0.0003 to 0.01%, Cu: 0.1 to 2.0%, Al: 0.01 to 0.1% and N: 0.01 to 0.05% as optional elements, with the balance being Fe and unavoidable impurities, to air-cooling or rapid cooling after holding for 3 seconds to 30 minutes at 250 to 500° C. after an austenitizing treatment, and has a yield ratio of 0.85 or less. In this patent literature, the steel wire for a spring having a high fatigue limit that has the aforementioned composition is proposed based on the finding that the fatigue limit of a spring depends on the yield strength of the spring, with the fatigue limit of the spring increasing as the yield strength of the spring increases (see lines 1 to 5 in the right upper column on page 2 of Patent Literature 1).

A spring disclosed in Patent Literature 2 is produced using an oil tempered wire having a tempered martensitic structure. The oil tempered wire consists of, in mass %, C: 0.50 to 0.75%, Si: 1.50 to 2.50%, Mn: 0.20 to 1.00%, Cr: 0.70 to 2.20% and V: 0.05 to 0.50%, with the balance being Fe and unavoidable impurities. When this oil tempered wire is subjected to gas soft nitriding for two hours at 450° C., the lattice constant of a nitrided layer formed on a wire surface portion of the oil tempered wire is 2.881 to 2.890 Å. Further, when this oil tempered wire is subjected to heating for two hours at 450° C., the tensile strength becomes 1974 MPa or more, the yield stress becomes 1769 MPa or more, and the reduction of area becomes more than 40%. In this patent literature, an oil tempered wire that is to serve as the starting material of a spring which is produced by being subjected to nitriding is defined. In the case of producing a spring by nitriding, as the time period in which nitriding is performed increases, the yield strength and tensile strength of the steel material of the spring decrease. In this case, the internal hardness of the steel material decreases, and the fatigue limit decreases. Therefore, in Patent Literature 2 it is disclosed that by using an oil tempered wire in which the yield strength of the steel material does not decrease even if the nitriding treatment time is long, a spring having a high fatigue limit can be produced (see paragraphs [0025] and [0026] of Patent Literature 2).

A steel wire for a high strength spring disclosed in Patent Literature 3 has a chemical composition containing C: 0.5 to 0.7%, Si: 1.5 to 2.5%, Mn: 0.2 to 1.0%, Cr: 1.0 to 3.0% and V: 0.05 to 0.5%, in which Al is controlled to 0.005% or less (not including 0%), with the balance being Fe and unavoidable impurities. In the steel wire, the number of spherical cementite particles having an equivalent circular diameter ranging from 10 to 100 nm is 30 pieces/$\mu m^2$ or more, and a Cr concentration in the cementite is, in mass %, 20% or more and a V concentration is 2% or more. In Patent Literature 3 it is disclosed that increasing the strength of the steel wire is effective for improving the fatigue limit and settling resistance (see paragraph [0003] of Patent Literature 3). Further, it is disclosed that by making the number of fine spherical cementite particles having an equivalent circular diameter ranging from 10 to 100 nm 30 pieces/$\mu m^2$ or more, and making the Cr concentration in the cementite 20% or more and making the V concentration in the cementite 2% or more in mass %, decomposition and elimination of cementite can be suppressed during a heat treatment such as a stress relief annealing treatment or nitriding during the production process, and the strength of the steel wire can be maintained (paragraph [0011] of Patent Literature 3).

A steel wire which serves as the starting material for a spring which is disclosed in Patent Literature 4 has a chemical composition consisting of, in mass %, C: 0.45 to 0.7%, Si: 1.0 to 3.0%, Mn: 0.1 to 2.0%, P: 0.015% or less, S: 0.015% or less, N: 0.0005 to 0.007%, and t-O: 0.0002 to 0.01%, with the balance being Fe and unavoidable impurities, and has a tensile strength of 2000 MPa or more. On a microscopic observation surface, the occupied area fraction of cementite-based spherical carbides and alloy carbides having an equivalent circular diameter of 0.2 µm or more is 7% or less, the density of cementite-based spherical carbides and alloy carbides having an equivalent circular diameter ranging from 0.2 to 3 is 1 pieces/$\mu m^2$ or less, the density of cementite-based spherical carbides and alloy carbides having an equivalent circular diameter of more than 3 µm is 0.001 pieces/$\mu m^2$ or less, the prior-austenite grain size number is 10 or more, the amount of retained austenite is 15 mass % or less, and the area fraction of a sparse region where the density of cementite-based spherical carbides having an equivalent circular diameter of 2 µm or more is low is 3% or less. In Patent Literature 4, it is disclosed that it is necessary to further increase the strength in order to further improve spring performance with respect to fatigue and settling and the like. In Patent Literature 4 it is also disclosed that by controlling the microstructure and controlling the distribution of cementite-based fine carbides, enhancement of the strength of the spring is realized and the spring performance with respect to fatigue and settling and the like is improved (see paragraph [0009] and [0021] of Patent Literature 4).

CITATION LIST

Patent Literature

Patent Literature 1: Japanese Patent Application Publication No. 2-57637
Patent Literature 2: Japanese Patent Application Publication No. 2010-163689
Patent Literature 3: Japanese Patent Application Publication No. 2007-302950
Patent Literature 4: Japanese Patent Application Publication No. 2006-183137

SUMMARY OF INVENTION

Technical Problem

In the respective techniques described in the above Patent Literatures 1 to 4, an approach is adopted in which spring characteristics such as the fatigue limit or settling characteristics are improved by increasing the strength (hardness) of the steel material constituting the spring. However, the fatigue limit of a damper spring may be increased by adopting another approach.

An objective of the present disclosure is to provide a damper spring having an excellent fatigue limit.

Solution to Problem

A damper spring according to the present disclosure is a damper spring wherein:
when a wire diameter is defined as d (mm), a chemical composition at a d/4 depth position from a surface contains, in mass %,
C: 0.50 to 0.80%,
Si: 1.20 to less than 2.50%,
Mn: 0.25 to 1.00%,
P: 0.020% or less,
S: 0.020% or less,
Cr: 0.40 to 1.90%,
V: 0.05 to 0.60%, and
N: 0.0100% or less,
with the balance being Fe and impurities,
and wherein:
a number density of V-based precipitates having a maximum diameter ranging from 2 to 10 nm is 5000 to 80000 pieces/$\mu m^3$.

Advantageous Effect of Invention

A damper spring according to the present disclosure has an excellent fatigue limit.

DESCRIPTION OF EMBODIMENTS

Figure 1A:
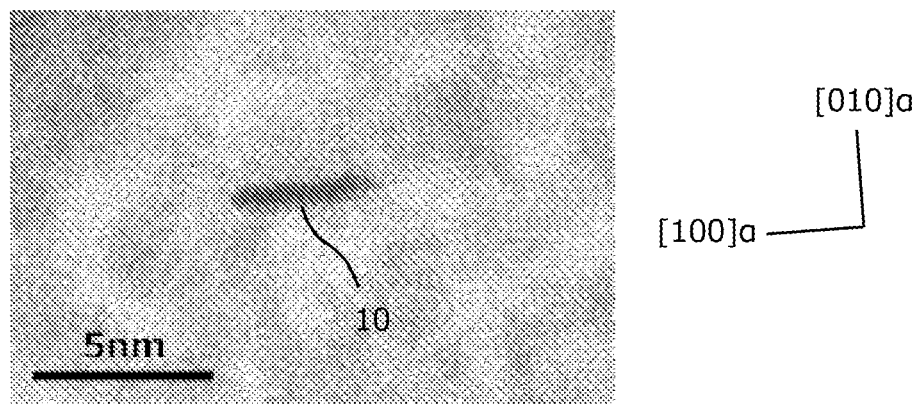
FIG. 1A is one example of a TEM image of a (001) plane in ferrite of a thin film sample.

The present inventors conducted studies pertaining to a damper spring which is excellent in a fatigue limit. First, the present inventors adopted an approach of increasing the fatigue limit of a damper spring by increasing the strength and hardness of the steel material constituting the damper spring, similarly to the steel material constituting the springs disclosed in the aforementioned prior documents. Specifically, the present inventors investigated increasing the fatigue limit of a damper spring by increasing the strength and hardness of the steel material by making cementite fine. As a result, as described in Patent Literature 3 and Patent Literature 4, the finer the cementite was made, the higher the strength and hardness of the steel material could be made. Accordingly, the present inventors considered that by making the cementite fine, the fatigue limit of the damper spring is also increased.

However, if the strength and hardness of the steel material is increased, performing cold coiling becomes difficult, and therefore producing a damper spring becomes difficult. Hence the present inventors considered that there is a limit to the approach of increasing the fatigue limit of a damper spring by increasing the strength and hardness of the steel material constituting the damper spring by making the cementite fine.

Therefore, the present inventors had the idea of increasing the fatigue limit of a damper spring by adopting a technical idea that is different from the technical idea of increasing the fatigue limit of a damper spring by increasing the strength and hardness of the steel material constituting the damper spring. As described in Patent Literatures 1 to 4, conventional spring techniques have been based on the idea that the strength and hardness of the steel material constituting a damper spring has a positive correlation with the fatigue limit of the damper spring. Thus, the idea that there is a positive correlation between the strength and hardness of the steel material and the fatigue limit of the damper spring is common technical knowledge with respect to spring techniques. Therefore, conventionally, as a substitute for a fatigue test which takes an extremely long time, fatigue limits of damper springs have been predicted based on the strength of the steel material that is obtained by a tensile test that is completed in a short time, or based on the hardness of the steel material that is obtained by a hardness test that is completed in a short time. In other words, the fatigue limits of damper springs have been predicted based on the results of a tensile test or a hardness test that do not take a long time, without performing a fatigue test that does take time.

However, the present inventors considered that the strength and hardness of the steel material and the fatigue limit of the damper spring do not necessarily always correlate. Therefore, the present inventors investigated methods for increasing the fatigue limit by another technical idea other than increasing the fatigue limit of a damper spring by increasing the strength and hardness of the steel material.

Here, the present inventors focused their attention on V-based precipitates as typified by V carbides and V carbo-nitrides. In the present specification, the term "V-based precipitates" means precipitates containing V or containing V and Cr. The V-based precipitates need not contain Cr.

Instead of the conventional technical idea of increasing the fatigue limit of a damper spring by increasing the strength of the steel material, the present inventors conceived of increasing the fatigue limit of a damper spring by formation of a large number of nano-sized fine V-based precipitates. Therefore, the present inventors considered that a chemical composition consisting of, in mass %, C: 0.50 to 0.80%, Si: 1.20 to less than 2.50%, Mn: 0.25 to 1.00%, P: 0.020% or less, S: 0.020% or less, Cr: 0.40 to 1.90%, V: 0.05 to 0.60%, N: 0.0100% or less, Mo: 0 to 0.50%, Nb: 0 to 0.050%, W: 0 to 0.60%, Ni: 0 to 0.500%, Co: 0 to 0.30%, B: 0 to 0.0050%, Cu: 0 to 0.050%, Al: 0 to 0.0050%, and Ti: 0 to 0.050%, with the balance being Fe and impurities, is suitable as the chemical composition of a damper spring for increasing the fatigue limit by making use of nano-sized V-based precipitates. The present inventors then produced damper springs by subjecting a steel material having the aforementioned chemical composition to a heat treatment at various heat-treatment temperatures after quenching. The present inventors then investigated the fatigue limit of the damper springs as well as a fatigue limit ratio that is defined by the ratio of the fatigue limit to the hardness of the damper spring (that is, fatigue limit ratio=fatigue limit/hardness of damper spring).

As a result of such investigations, the present inventors obtained the following novel finding with regard to a damper spring having the aforementioned chemical composition. As described in the foregoing background art, when producing damper springs, in some cases nitriding is performed and in some cases nitriding is not performed. In a case where nitriding is performed in the conventional process for producing a damper spring, in a heat treatment (stress relief annealing treatment step or the like) after a quenching and tempering step, a heat treatment is performed at a lower temperature than a nitriding temperature used for nitriding. This is because the conventional process for producing a damper spring is based on the technical idea that the fatigue limit of a spring is increased by keeping the strength and hardness of the steel material high. In a case where nitriding is performed, it is necessary to perform heating to a nitriding temperature. Therefore, in the conventional production process, a decrease in the strength of the damper spring has been suppressed by setting a heat-treatment temperature in a heat treatment step other than nitriding to, as much as possible, a temperature that is less than the nitriding temperature.

However, for the damper spring of the present embodiment, instead of the technical idea of increasing the fatigue limit by increasing the strength of the steel material, the present inventors adopted the technical idea of increasing the fatigue limit of a damper spring by formation of a large number of nano-sized fine V-based precipitates. For this reason, it has been revealed by the investigations of the present inventors that, during the production process, if a heat-treatment at a heat-treatment temperature within the range of 540 to 650° C. is performed to cause a large number of nano-sized fine V-based precipitates to precipitate, even if the heat-treatment temperature for precipitating V-based precipitates is higher than a nitriding temperature and as a result the strength of a core portion of the damper spring decreases (that is, even if the hardness of the core portion of the damper spring is low), an excellent fatigue limit will be obtained, and a fatigue limit ratio that is defined by the ratio of the fatigue limit to the core portion hardness of the damper spring will be high. More specifically, it has been revealed for the first time by the investigations of the present inventors that, in a damper spring, if the number density of V-based precipitates having a maximum diameter ranging from 2 to 10 nm is 5000 pieces/$\mu m^3$ or more, a sufficient fatigue limit is obtained in a damper spring.

As described above, the damper spring of the present embodiment is not a damper spring derived from the conventional technical idea which is based on the strength and hardness of the steel material constituting a damper spring and the fatigue limit of the damper spring having a positive correlation, and is instead a damper spring derived from a completely different technical idea to the conventional technical idea, and is composed as described below.

[1]

A damper spring, wherein:

when a wire diameter is defined as d (mm), a chemical composition at a d/4 depth position from a surface contains, in mass %, C: 0.50 to 0.80%, Si: 1.20 to less than 2.50%, Mn: 0.25 to 1.00%, P: 0.020% or less, S: 0.020% or less, Cr: 0.40 to 1.90%, V: 0.05 to 0.60%, and N: 0.0100% or less, with the balance being Fe and impurities, and wherein:

a number density of V-based precipitates having a maximum diameter ranging from 2 to 10 nm is 5000 to 80000 pieces/$\mu m^3$.

Here, the term "V-based precipitates" refers to, as mentioned above, carbides or carbo-nitrides containing V, or carbides or carbo-nitrides containing V and Cr, and for example refers to any one or more kinds among V carbides and V carbo-nitrides. The V-based precipitates may be composite precipitates containing either one of a V carbide and a V carbo-nitride, and one or more kinds of other element. The V-based precipitates precipitate in a plate shape along a {001} plane in ferrite (body-centered cubic lattice). Therefore, in a TEM image of a (001) plane in ferrite, V-based precipitates are observed as line segments (edge portions) extending in a linear shape parallel to the [100] orientation or [010] orientation. Precipitates other than V-based precipitates are not observed as line segments (edge portions) extending in a linear shape parallel to the [100] orientation or [010] orientation. In other words, only V-based precipitates are observed as line segments (edge portions) extending in a linear shape parallel to the [100] orientation or [010] orientation. Therefore, by observing a TEM image of a (001) plane in ferrite, V-based precipitates can be easily distinguished from Fe carbides such as cementite, and the V-based precipitates can be identified. That is, in the present specification, in a TEM image of a (001) plane in ferrite, line segments extending along the [100] orientation or the [010] orientation are defined as V-based precipitates.

[2]

The damper spring described in [1], wherein:

the chemical composition contains one or more types of element selected from the group consisting of:

Mo: 0.50% or less,

Nb: 0.050% or less,

W: 0.60% or less,

Ni: 0.500% or less,

Co: 0.30% or less, and

B: 0.0050% or less.

[3]

The damper spring described in [1] or [2], wherein:
the chemical composition contains one or more types of element selected from the group consisting of:
Cu: 0.050% or less,
Al: 0.0050% or less, and
Ti: 0.050% or less.

Hereunder, the damper spring of the present embodiment is described in detail. The symbol "%" in relation to an element means "mass %" unless specifically stated otherwise.

Configuration of Damper Spring of Present Embodiment

The damper spring of the present embodiment has a coil shape. The wire diameter, mean diameter of coil, coil inner diameter, coil outer diameter, free height, number of active coils, total number of coils, direction of helix, and pitch of the damper spring are not particularly limited.

The damper spring of the present embodiment may be a damper spring subjected to nitriding or may be a damper spring not subjected to nitriding. If the damper spring was subjected to nitriding, the damper spring includes a nitrided layer, and a core portion formed further inward than the nitrided layer. The nitrided layer is formed in an outer layer of the damper spring. The nitrided layer includes a compound layer, and a diffusion layer that is formed further inward than the compound layer. The nitrided layer need not include a compound layer. The core portion is a base material portion that is further inward than the nitrided layer, and is a portion which is substantially unaffected by the diffusion of nitrogen caused by the nitriding which is to be described later. It is possible to distinguish between the nitrided layer and the core portion in the nitrided damper spring by microstructure observation. Note that, when the wire diameter of a damper spring is defined as d (mm), in a nitrided damper spring, a d/4 depth position from the surface corresponds to the core portion. If the damper spring was not subjected to nitriding, the damper spring does not include a nitrided layer.

[Chemical Composition]

In the damper spring of the present embodiment, the chemical composition at a d/4 depth position from the surface contains the following elements.

C: 0.50 to 0.80%

Carbon (C) increases the fatigue limit of a damper spring. If the C content is less than 0.50%, even if the contents of other elements are within the range of the present embodiment, the aforementioned effect will not be sufficiently obtained. On the other hand, if the C content is more than 0.80%, coarse cementite will form. In this case, even if the contents of other elements are within the range of the present embodiment, the ductility of the steel material that will serve as a starting material of a damper spring will decrease. In addition, the fatigue limit of a damper spring will, on the contrary, decrease. Accordingly, the C content is 0.50 to 0.80%. A preferable lower limit of the C content is 0.51%, more preferably is 0.52%, further preferably is 0.54%, and further preferably is 0.56%. A preferable upper limit of the C content is 0.79%, more preferably is 0.78%, further preferably is 0.76%, further preferably is 0.74%, further preferably is 0.72%, and further preferably is 0.70%.

Si: 1.20 to Less than 2.50%

Silicon (Si) increases the fatigue limit of a damper spring, and also increases the settling resistance of the damper spring. Si also deoxidizes the steel. In addition, Si increases the temper softening resistance of the steel material. Therefore, even after a quenching and tempering treatment is performed in the process for producing a damper spring, the strength and fatigue limit of the damper spring can be maintained at a high level. If the Si content is less than 1.20%, even if the contents of other elements are within the range of the present embodiment, the aforementioned effects will not be sufficiently obtained. On the other hand, if the Si content is 2.50% or more, even if the contents of other elements are within the range of the present embodiment, the ductility of the steel material that will serve as the starting material of the damper spring will decrease, and the fatigue limit of the damper spring will, on the contrary, decrease. In addition, if the Si content is 2.50% or more, even if the contents of other elements are within the range of the present embodiment, the strength of the steel material that will serve as the starting material of the damper spring will increase and the cold workability of the steel material will decrease. Therefore, the Si content is 1.20 to less than 2.50%. A preferable lower limit of the Si content is 1.25%, more preferably is 1.30%, further preferably is 1.40%, further preferably is 1.50%, further preferably is 1.60%, further preferably is 1.70%, and further preferably is 1.80%. A preferable upper limit of the Si content is 2.48%, more preferably is 2.47%, further preferably is 2.46%, further preferably is 2.45%, further preferably is 2.43%, and further preferably is 2.40%.

Mn: 0.25 to 1.00%

Manganese (Mn) improves the hardenability of the steel, and increases the fatigue limit of the damper spring. If the Mn content is less than 0.25%, even if the contents of other elements are within the range of the present embodiment, the aforementioned effect will not be sufficiently obtained. On the other hand, if the Mn content is more than 1.00%, even if the contents of other elements are within the range of the present embodiment, the strength of the steel material that will serve as the starting material of the damper spring will increase and the cold workability of the steel material will decrease. Therefore, the Mn content is 0.25 to 1.00%. A preferable lower limit of the Mn content is 0.27%, more preferably is 0.29%, further preferably is 0.35%, further preferably is 0.40%, further preferably is 0.50%, and further preferably is 0.55%. A preferable upper limit of the Mn content is 0.98%, more preferably is 0.96%, further preferably is 0.90%, further preferably is 0.85%, and further preferably is 0.80%.

P: 0.020% or Less

Phosphorus (P) is an impurity. P segregates at grain boundaries, and decreases the fatigue limit of the damper spring. Therefore, the P content is 0.020% or less. A preferable upper limit of the P content is 0.018%, more preferably is 0.016%, further preferably is 0.014%, and further preferably is 0.012%. The P content is preferably as low as possible. However, excessively reducing the P content will raise the production cost. Therefore, when taking into consideration normal industrial production, a preferable lower limit of the P content is more than 0%, more preferably is 0.001%, and further preferably is 0.002%.

S: 0.020% or Less

Sulfur (S) is an impurity. S segregates at grain boundaries similarly to P, and combines with Mn to form MnS, and decreases the fatigue limit of the damper spring. Therefore, the S content is 0.020% or less. A preferable upper limit of the S content is 0.018%, further preferably is 0.016%, further preferably is 0.014%, and further preferably is 0.012%. The S content is preferably as low as possible. However, excessively reducing the S content will raise the production cost. Therefore, when taking into consideration normal industrial production, a preferable lower limit of the S content is more than 0%, more preferably is 0.001%, and further preferably is 0.002%.

Cr: 0.40 to 1.90%

Chromium (Cr) improves the hardenability of the steel material, and increases the fatigue limit of the damper spring. If the Cr content is less than 0.40%, even if the contents of other elements are within the range of the present embodiment, the aforementioned effect will not be sufficiently obtained. On the other hand, if the Cr content is more than 1.90%, even if the contents of other elements are within the range of the present embodiment, coarse Cr carbides will excessively form and the fatigue limit of the damper spring will decrease. Therefore, the Cr content is 0.40 to 1.90%. A preferable lower limit of the Cr content is 0.42%, more preferably is 0.45%, further preferably is 0.50%, further preferably is 0.60%, further preferably is 0.80%, further preferably is 1.00%, and further preferably is 1.20%. A preferable upper limit of the Cr content is 1.88%, more preferably is 1.85%, further preferably is 1.80%, further preferably is 1.70%, and further preferably is 1.60%.

V: 0.05 to 0.60%

Vanadium (V) combines with C and/or N to form fine V-based precipitates, and increases the fatigue limit of the damper spring. If the V content is less than 0.05%, even if the contents of other elements are within the range of the present embodiment, the aforementioned effect will not be sufficiently obtained. On the other hand, if the V content is more than 0.60%, even if the contents of other elements are within the range of the present embodiment, V-based precipitates will coarsen and a large number of V-based precipitates with a maximum diameter of more than 10 nm will form. In such a case, the fatigue limit of the damper spring will, on the contrary, decrease. Therefore, the V content is 0.05 to 0.60%. A preferable lower limit of the V content is 0.06%, more preferably is 0.07%, further preferably is 0.10%, further preferably is 0.15%, and further preferably is 0.20%. A preferable upper limit of the V content is 0.59%, more preferably is 0.58%, further preferably is 0.55%, further preferably is 0.50%, further preferably is 0.45%, and further preferably is 0.40%.

N: 0.0100% or Less

Nitrogen (N) is an impurity. N combines with Al or Ti to form AlN or TiN, and decreases the fatigue limit of the damper spring. Therefore, the N content is 0.0100% or less. A preferable upper limit of the N content is 0.0090%, more preferably is 0.0080%, further preferably is 0.0060%, and further preferably is 0.0050%. The N content is preferably as low as possible. However, excessively reducing the N content will raise the production cost. Therefore, a preferable lower limit of the N content is more than 0%, more preferably is 0.0001%, and further preferably is 0.0005%.

The balance in the chemical composition of the damper spring according to the present embodiment is Fe and impurities. Here, the term "impurities" refers to elements which, during industrial production of the steel material that serves as the starting material of the damper spring, are mixed in from ore or scrap that is used as a raw material, or from the production environment or the like, and which are allowed within a range that does not adversely affect the damper spring of the present embodiment.

[Regarding Optional Elements]

The chemical composition of the damper spring according to the present embodiment may contain, in lieu of a part of Fe, one or more types of element selected from the group consisting of Mo, Nb, W, Ni, Co and B. These elements are optional elements, and each of these elements increases the fatigue limit of a damper spring.

Mo: 0.50% or Less

Molybdenum (Mo) is an optional element, and need not be contained. That is, the Mo content may be 0%. When contained, that is, when the Mo content is more than 0%, Mo improves the hardenability of the steel material and increases the fatigue limit of the damper spring. Mo also increases the temper softening resistance of the steel material. Therefore, even after a quenching and tempering treatment is performed in the damper spring production process, the strength and fatigue limit of the damper spring can be maintained at a high level. If even a small amount of Mo is contained, the aforementioned effects are obtained to a certain extent. However, if the Mo content is more than 0.50%, even if the contents of other elements are within the range of the present embodiment, the strength of the steel material that will serve as the starting material of the damper spring will increase, and the cold workability of the steel material will decrease. Therefore, the Mo content is 0 to 0.50%, and when Mo is contained, the Mo content is 0.50% or less. A preferable lower limit of the Mo content is more than 0%, more preferably is 0.01%, further preferably is 0.05%, and further preferably is 0.10%. A preferable upper limit of the Mo content is 0.45%, more preferably is 0.40%, further preferably is 0.35%, and further preferably is 0.30%.

Nb: 0.050% or Less

Niobium (Nb) is an optional element; and need not be contained. That is, the Nb content may be 0%. When contained, that is, when the Nb content is more than 0%, Nb combines with C and/or N to form carbides, nitrides or carbo-nitrides (hereunder, referred to as "Nb carbo-nitrides and the like"). The Nb carbo-nitrides and the like refine austenite grains and thereby increase the fatigue limit of the damper spring. If even a small amount of Nb is contained, the aforementioned effect is obtained to a certain extent. However, if the Nb content is more than 0.050%, coarse Nb carbo-nitrides and the like form, and the fatigue limit of the damper spring decreases. Therefore, the Nb content is 0 to 0.050%, and when Nb is contained, the Nb content is 0.050% or less. A preferable lower limit of the Nb content is more than 0%, more preferably is 0.001%, further preferably is 0.005%, and further preferably is 0.010%. A preferable upper limit of the Nb content is 0.048%, more preferably is 0.046%, further preferably is 0.042%, further preferably is 0.038%, further preferably is 0.035%, further preferably is 0.030%, and further preferably is 0.025%.

W: 0.60% or Less

Tungsten (W) is an optional element, and need not be contained. That is, the W content may be 0%. When contained, that is, when the W content is more than 0%, W improves the hardenability of the steel material and increases the fatigue limit of the damper spring. W also increases the temper softening resistance of the steel material. Therefore, even after a quenching and tempering treatment is performed in the damper spring production process, the strength and fatigue limit of the damper spring can be maintained at a high level. If even a small amount of W is contained, the aforementioned effects are obtained to a certain extent. However, if the W content is more than 0.60%, even if the contents of other elements are within the range of the present embodiment, the strength of the steel material that will serve as the starting material of the damper spring will increase, and the cold workability of the steel material will decrease. Therefore, the W content is 0 to 0.60%, and when W is contained, the W content is 0.60% or less. A preferable lower limit of the W content is more than 0%, more preferably is 0.01%, further preferably is 0.05%, and further preferably is 0.10%. A preferable upper limit of the W content is 0.55%, more preferably is 0.50%, further preferably is 0.45%, further preferably is 0.40%, further preferably is 0.35%, and further preferably is 0.30%.

Ni: 0.500% or Less

Nickel (Ni) is an optional element, and need not be contained. That is, the Ni content may be 0%. When contained, that is, when the Ni content is more than 0%, Ni improves the hardenability of the steel material and increases the fatigue limit of the damper spring. If even a small amount of Ni is contained, the aforementioned effect is obtained to a certain extent. However, if the Ni content is more than 0.500%, even if the contents of other elements are within the range of the present embodiment, the strength of the steel material that will serve as the starting material of the damper spring will increase, and the cold workability of the steel material will decrease. Therefore, the Ni content is 0 to 0.500%, and when Ni is contained, the Ni content is 0.500% or less. A preferable lower limit of the Ni content is more than 0%, more preferably is 0.001%, further preferably is 0.005%, further preferably is 0.010%, further preferably is 0.050%, further preferably is 0.100%, and further preferably is 0.150%. A preferable upper limit of the Ni content is 0.450%, more preferably is 0.400%, further preferably is 0.350%, further preferably is 0.300%, and further preferably is 0.250%.

Co: 0.30% or Less

Cobalt (Co) is an optional element, and need not be contained. That is, the Co content may be 0%. When contained, that is, when the Co content is more than 0%, Co increases the temper softening resistance of the steel material. Therefore, even after a quenching and tempering treatment is performed in the process for producing a damper spring, the strength and fatigue limit of the damper spring can be maintained at a high level. If even a small amount of Co is contained, the aforementioned effect is obtained to a certain extent. However, if the Co content is more than 0.30%, even if the contents of other elements are within the range of the present embodiment, the strength of the steel material that will serve as the starting material of the damper spring will increase, and the cold workability of the steel material will decrease. Therefore, the Co content is 0 to 0.30%, and when Co is contained, the Co content is 0.30% or less. A preferable lower limit of the Co content is more than 0%, more preferably is 0.01%, further preferably is 0.05%, and further preferably is 0.10%. A preferable upper limit of the Co content is 0.28%, more preferably is 0.26%, and further preferably is 0.24%.

B: 0.0050% or Less

Boron (B) is an optional element, and need not be contained. That is, the B content may be 0%. When contained, that is, when the B content is more than 0%, B improves the hardenability of the steel material and increases the fatigue limit of the damper spring. If even a small amount of B is contained, the aforementioned effect is obtained to a certain extent. However, if the B content is more than 0.0050%, even if the contents of other elements are within the range of the present embodiment, the strength of the steel material that will serve as the starting material of the damper spring will increase, and the cold workability of the steel material will decrease. Therefore, the B content is 0 to 0.0050%, and when B is contained, the B content is 0.0050% or less. A preferable lower limit of the B content is more than 0%, more preferably is 0.0001%, further preferably is 0.0010%, further preferably is 0.0015%, and further preferably is 0.0020%. A preferable upper limit of the B content is 0.0049%, more preferably is 0.0048%, further preferably is 0.0046%, further preferably is 0.0044%, and further preferably is 0.0042%.

The chemical composition of the damper spring according to the present embodiment may further contain, as an impurity, in lieu of a part of Fe, one or more types of element selected from the group consisting of Cu: 0.050% or less, Al: 0.0050% or less, and Ti: 0.050% or less. If the contents of these elements are within the aforementioned ranges, the advantageous effects of the damper spring according to the present embodiment will be obtained.

Cu: 0.050% or Less

Copper (Cu) is an impurity, and need not be contained. That is, the Cu content may be 0%. Cu decreases the cold workability of the steel material. If the Cu content is more than 0.050%, even if the contents of other elements are within the range of the present embodiment, the cold workability of the steel material will noticeably decrease. Therefore, the Cu content is 0.050% or less. Since the Cu content may be 0%, the Cu content is within the range of 0 to 0.050%. A preferable upper limit of the Cu content is 0.045%, more preferably is 0.040%, further preferably is 0.030%, further preferably is 0.025%, further preferably is 0.020%, and further preferably is 0.018%. As mentioned above, the Cu content is preferably as low as possible. However, excessively reducing the Cu content will raise the production cost. Therefore, a preferable lower limit of the Cu content is more than 0%, more preferably is 0.001%, further preferably is 0.002%, and further preferably is 0.005%.

Al: 0.0050% or Less

Aluminum (Al) is an impurity, and need not be contained. That is, the Al content may be 0%. Al forms coarse non-metallic inclusions, and thereby decreases the fatigue limit of the damper spring. If the Al content is more than 0.0050%, even if the contents of other elements are within the range of the present embodiment, the fatigue limit of the spring will noticeably decrease. Therefore, the Al content is 0.0050% or less. Since the Al content may be 0%, the Al content is within the range of 0 to 0.0050%. A preferable upper limit of the Al content is 0.0045%, more preferably is 0.0040%, further preferably is 0.0030%, further preferably is 0.0025%, and further preferably is 0.0020%. As mentioned above, the Al content is preferably as low as possible. However, excessively reducing the Al content will raise the production cost. Therefore, a preferable lower limit of the Al content is more than 0%, more preferably is 0.0001%, further preferably is 0.0003%, and further preferably is 0.0005%.

Ti: 0.050% or Less

Titanium (Ti) is an impurity and need not be contained. That is, the Ti content may be 0%. Ti forms coarse TiN. TiN easily becomes a starting point of a fracture, and thus decreases the fatigue limit of the damper spring. If the Ti content is more than 0.050%, even if the contents of other elements are within the range of the present embodiment, the fatigue limit of the spring will noticeably decrease. Therefore, the Ti content is 0.050% or less. Since the Ti content may be 0%, the Ti content is within the range of 0 to 0.050%. A preferable upper limit of the Ti content is 0.045%, more preferably is 0.040%, further preferably is 0.030%, and further preferably is 0.020%. As mentioned above, the Ti content is preferably as low as possible. However, excessively reducing the Ti content will raise the production cost. Therefore, a preferable lower limit of the Ti content is more than 0%, and further preferably is 0.001%.

[Number Density of V-Based Precipitates in Damper Spring]

In the damper spring of the present embodiment, the number density of V-based precipitates having a maximum diameter ranging from 2 to 10 nm is 5000 to 80000 pieces/$\mu m^3$. In the present specification, the term "number density of V-based precipitates" means the number of V-based precipitates per unit volume (1 $\mu m^3$ in the present specification).

In the present specification, the term "V-based precipitates" refers to precipitates containing V, or V and Cr. The V-based precipitates are, for example, V carbides and V carbo-nitrides. The V-based precipitates may be composite precipitates containing either one of a V carbide and a V carbo-nitride and one or more kinds of other element. As mentioned above, the V-based precipitates need not contain Cr. The V-based precipitates precipitate in a plate shape along a {001} plane in ferrite. Therefore, in a TEM image of a (001) plane in ferrite, V-based precipitates are observed as line segments (edge portions) extending in a linear shape parallel to the [100] orientation or [010] orientation. Therefore, by observing a TEM image of the (001) plane in ferrite, V-based precipitates can be easily distinguished from Fe carbides such as cementite, and the V-based precipitates can be identified.

Note that, in a steel wire in which the content of each element in the chemical composition is within the range of the present embodiment and which is produced by a production method that is described later, in a TEM image of the (001) plane in ferrite, the fact that a precipitate which is observed as a line segment (edge portion) extending along the [100] orientation or [010] orientation is a V-based precipitate can be confirmed by analysis using energy dispersive X-ray spectroscopy (EDS) and nano beam electron diffraction (NBD).

Specifically, in a TEM image of the (001) plane in ferrite, when a precipitate which is observed as a line segment extending along the [100] orientation or [010] orientation is subjected to compositional analysis by EDS, V or V and Cr are detected. Further, when the precipitate is subjected to crystal structure analysis by NBD, the crystal structure of the precipitate is cubic, and the lattice constant is a=b=c=within the range of 0.4167 nm±5%. Note that, in the database of the International Center for Diffraction Data (ICDD), the crystal structure of V-based precipitates (V carbides and V carbo-nitrides) is cubic, and the lattice constant is 0.4167 nm (ICDD No. 065-8822).

By causing a large number of nano-sized V-based precipitates having a maximum diameter ranging from 2 to 10 nm to precipitate in the damper spring of the present embodiment, the fatigue limit of a damper spring is increased. If the number density of V-based precipitates having a maximum diameter ranging from 2 to 10 nm is less than 5000 pieces/$\mu m^3$, the V-based precipitates that contribute to improving the fatigue limit will be too few. In this case, a sufficient fatigue limit will not be obtained in the damper spring. If the number density of V-based precipitates having a maximum diameter ranging from 2 to 10 nm is 5000 pieces/$\mu m^3$ or more, there will be sufficient V-based precipitates present in the damper spring. Consequently, the fatigue limit and fatigue limit ratio of the damper spring will noticeably increase. A preferable lower limit of the number density of V-based precipitates having a maximum diameter ranging from 2 to 10 nm is 6000 pieces/$\mu m^3$, more preferably is 7000 pieces/$\mu m^3$, further preferably is 8000 pieces/$\mu m^3$, further preferably is 10000 pieces/$\mu m^3$, further preferably is 11000 pieces/$\mu m^3$, further preferably is 12000 pieces/$\mu m^3$, further preferably is 13000 pieces/$\mu m^3$, further preferably is 14000 pieces/$\mu m^3$, and further preferably is 15000 pieces/$\mu m^3$.

Note that, the upper limit of the number density of V-based precipitates having a maximum diameter ranging from 2 to 10 nm is not particularly limited. However, in the case of the chemical composition described above, the upper limit of the number density of V-based precipitates having a maximum diameter ranging from 2 to 10 nm is, for example, 80000 pieces/$\mu m^3$. The upper limit of the number density of V-based precipitates having a maximum diameter ranging from 2 to 10 nm may be 75000 pieces/$\mu m^3$, or may be 73000 pieces/$\mu m^3$.

[Method for Measuring Number Density of V-Based Precipitates]

In the damper spring according to the present embodiment, the number density of V-based precipitates having a maximum diameter ranging from 2 to 10 nm can be determined by the following method. The damper spring according to the present embodiment is cut in the wire diameter direction, and a disc having a surface (cross section) in the wire diameter direction and having a thickness of 0.5 mm is extracted. Grinding and polishing are performed from both sides of the disc using emery paper to make the thickness of the disc 50 $\mu m$. Thereafter, a sample with a diameter of 3 mm is taken from the disc. The sample is immersed in 10% perchloric acid-glacial acetic acid solution to perform electrolytic polishing, to thereby prepare a thin film sample having a thickness of 100 nm.

The prepared thin film sample is observed using a transmission electron microscope (TEM). Specifically, first, analysis of Kikuchi lines is performed with respect to the thin film sample to identify the crystal orientation of the thin film sample. Next, the thin film sample is tilted based on the identified crystal orientation, and the thin film sample is set so that the (001) plane in ferrite (body-centered cubic lattice) can be observed. Specifically, the thin film sample is inserted into the TEM, and Kikuchi lines are observed. Tilting of the thin film sample is adjusted so that a [001] direction of ferrite in the Kikuchi lines matches the incident direction of an electron beam. After adjustment, when the actual image is observed, observation will be from a vertical direction to the (001) plane in ferrite. After performing the setting, observation visual fields at an arbitrary four locations of the thin film sample are identified. Each observation visual field is observed using an observation magnification of 200,000× and an accelerating voltage of 200 kV. The observation visual field is set to 0.09 $\mu m \times 0.09$ $\mu m$.

Figure 1B:
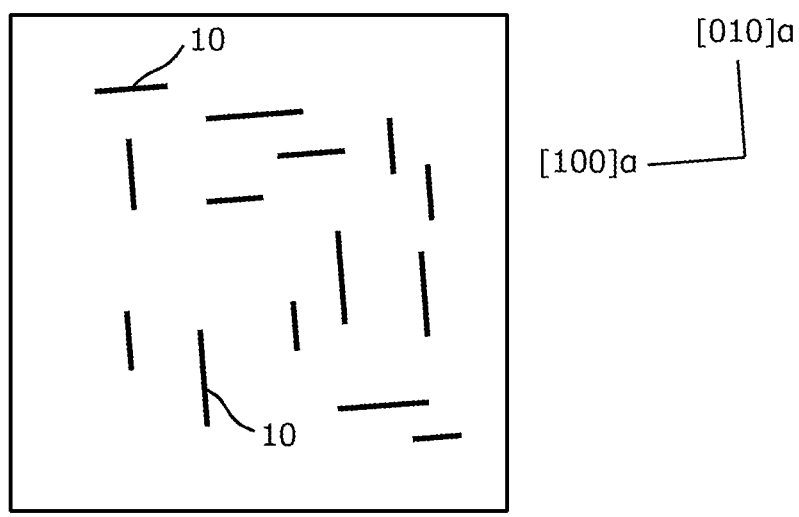
FIG. 1B is a schematic diagram of a TEM image of a (001) plane in ferrite of a thin film sample.

FIG. 1A is one example of a TEM image of a (001) plane in ferrite of a thin film sample, and FIG. 1B is a schematic diagram of a TEM image of a (001) plane in ferrite in a thin film sample. An axis denoted by [100]α in the figures means the [100] orientation in ferrite that is the parent phase. An axis denoted by [010]α in the figures means the [010] orientation in ferrite that is the parent phase. V-based precipitates precipitate in a plate shape along a {001} plane in ferrite. In ferrite grains on the (001) plane, V-based precipitates are observed as line segments (edge portions) extending linearly with respect to the [100] orientation or [010] orientation. In a TEM image, precipitates are shown with a contrast of a different brightness compared to the parent phase. Therefore, in a TEM image of a (001) plane in ferrite, line segments extending along the [100] orientation or [010] orientation are regarded as V-based precipitates. The length of the line segment of a V-based precipitate identified in the observation visual field is measured, and the measured length of the line segment is defined as the maximum diameter (nm) of the relevant V-based precipitate. For example, reference numeral 10 (a black-colored line segment) in FIG. 1A and FIG. 1B denotes a V-based precipitate.

The total number of V-based precipitates having a maximum diameter ranging from 2 to 10 nm in the observation visual fields at the four locations is determined by the aforementioned measurement. The number density (pieces/$\mu m^3$) of V-based precipitates having a maximum diameter ranging from 2 to 10 nm is determined based on the thus-determined total number of V-based precipitates and the total volume of the observation visual fields at the four locations.

[Microstructure of Damper Spring]

The microstructure of a damper spring is a structure mainly composed of martensite. Here, the phrase "the microstructure is a structure mainly composed of martensite" means that the area fraction of martensite in the microstructure is 90.0% or more. Note that, the term "martensite" as used in the present specification means tempered martensite. Phases other than martensite in the microstructure of the damper spring are precipitates, inclusions, and retained austenite. Note that, among these phases, precipitates and inclusions are small enough in comparison to the other phases that the precipitates and inclusions can be ignored.

The area fraction of martensite can be determined by the following method. The damper spring according to the present embodiment is cut in the wire diameter direction, and a test specimen is extracted. Among the surfaces of the extracted test specimen, a surface corresponding to a cross section in the wire diameter direction of the damper spring is adopted as an observation surface. After mirror-polishing the observation surface, the observation surface is subjected to etching using 2% nitric acid-alcohol (nital etching reagent). On the etched observation surface, a length obtained by dividing the wire diameter d of the damper spring into four equal parts is defined as d/4. On the observation surface, a d/4 depth position from the surface of the damper spring is observed using an optical microscope having a magnification of 500×, and photographic images of an arbitrary five visual fields are generated. The size of each visual field is set to 100 $\mu m \times 100$ $\mu m$.

In each visual field, the contrast differs for the respective phases of martensite, retained austenite, precipitates, inclusions and the like. Accordingly, martensite is identified based on the contrast. The gross area ($\mu m^2$) of martensite identified in each visual field is determined. The proportion of the gross area of martensite in all of the visual fields relative to the gross area (10000 $\mu m^2 \times 5$) of all the visual fields is defined as the area fraction (%) of martensite.

[Production Method]

Hereunder, one example of a method for producing the damper spring of the present embodiment is described. Note that, as long as the damper spring of the present embodiment is constituted as described above, the production method is not limited to the production method described hereinafter. However, the production method described hereinafter is one favorable example of producing the damper spring of the present embodiment.

Figure 2:
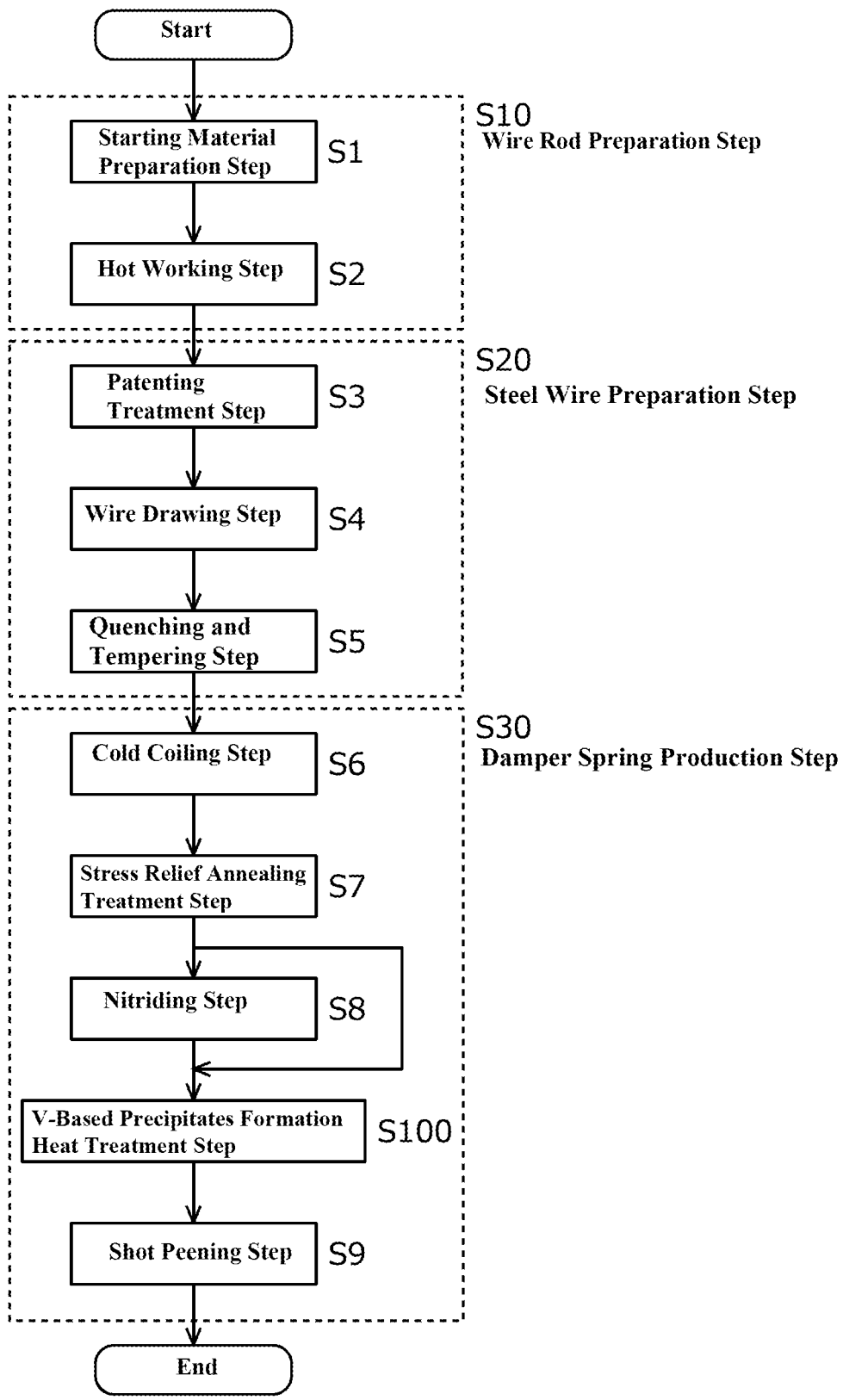
FIG. 2 is a flowchart illustrating a process for producing the damper spring of the present embodiment.

FIG. 2 is a flowchart illustrating one example of a process for producing the damper spring of the present embodiment. Referring to FIG. 2, the method for producing the damper spring of the present embodiment includes a wire rod preparation step (S10), a steel wire preparation step (S20), and a damper spring production step (S30). Each of these steps is described hereunder.

[Wire Rod Preparation Step (S10)]

The wire rod preparation step (S10) includes a starting material preparation step (S1), and a hot working step (S2). In the wire rod preparation step (S10), a wire rod that will serve as the starting material of the steel wire is produced.

[Starting Material Preparation Step (S1)]

In the starting material preparation step (S1), a starting material having the aforementioned chemical composition is produced. The term "starting material" used here refers to a bloom or an ingot. In the starting material preparation step (S1), first, a molten steel having the aforementioned chemical composition is produced by a well-known refining method. The produced molten steel is used to produce a starting material (bloom or ingot). Specifically, a bloom is produced by a continuous casting process using the molten steel. Alternatively, an ingot may be produced by an ingot-making process using the molten steel. The hot working step (S2) that is the next step is performed using the produced bloom or ingot (starting material).

[Hot Working Step (S2)]

In the hot working step (S2), the starting material (bloom or ingot) prepared in the starting material preparation step (S1) is subjected to hot rolling to produce a wire rod for damper spring.

The hot working step (S2) includes a rough rolling process and a finish rolling process. In the rough rolling process, first, the starting material is heated. A reheating furnace or a soaking pit is used for heating the starting material. The starting material is heated to 1200 to 1300° C. by the reheating furnace or soaking pit. For example, the starting material is held for 1.5 to 10.0 hours at a furnace temperature of 1200 to 1300° C. After heating, the starting material is extracted from the reheating furnace or soaking pit and subjected to hot rolling. For example, a blooming mill is used for the hot rolling in the rough rolling process. The blooming mill is used to subject the starting material to blooming to produce a billet. If a continuous mill is arranged downstream of the blooming mill, the continuous mill may be used to further perform hot rolling on the billet obtained after performing the blooming, to thereby produce a billet of an even smaller size. In the continuous mill, for example, horizontal stands having a pair of horizontal rolls and vertical stands having a pair of vertical rolls are alternately arranged in a row. By the above process, a billet is produced from the starting material in the rough rolling process.

In the finish rolling process, the billet obtained after the rough rolling process is subjected to hot rolling to produce a wire rod. Specifically, the billet is charged into a reheating furnace and heated at 900 to 1250° C. The heating time at the furnace temperature of 900 to 1250° C. is, for example, 0.5 to 5.0 hours. After heating, the billet is extracted from the reheating furnace. The extracted billet is subjected to hot rolling using a continuous mill to produce a wire rod. The diameter of the wire rod is not particularly limited. The diameter of the wire rod is determined based on the wire diameter of the damper spring that is the end product. A wire rod is produced by the above production process.

[Steel Wire Preparation Step (S20)]

In the steel wire preparation step (S20), a steel wire that will serve as the starting material for a damper spring is prepared. Here, the term "steel wire" means a steel material obtained by subjecting a wire rod that is a hot working material (hot rolling material) to wire drawing one or more times. The steel wire preparation step (S20) includes a patenting treatment step (S3) that is performed as necessary, a wire drawing step (S4), a quenching and tempering step (S5).

[Patenting Treatment Step (S3)]

In the patenting treatment step (S3), a patenting treatment is performed on the wire rod produced by the wire rod preparation step (S10) to make the microstructure of a wire rod a ferrite and pearlite structure, and thereby soften the wire rod. It suffices to perform the patenting treatment by a well-known method. The heat-treatment temperature in the patenting treatment is for example, 550° C. or more, and more preferably is 580° C. or more. The upper limit of the heat-treatment temperature in the patenting treatment is 750° C. Note that, the patenting treatment step (S3) is not an essential step, and is an arbitrary step. That is, the patenting treatment step (S3) need not be performed.

[Wire Drawing Step (S4)]

If the patenting treatment step (S3) is performed, in the wire drawing step (S4) the wire rod after the patenting treatment step (S3) is subjected to wire drawing. If the patenting treatment step (S3) is not performed, in the wire drawing step (S4) the wire rod after the hot working step (S2) is subjected to wire drawing. By performing wire drawing, a steel wire having a desired diameter is produced. The wire drawing step (S4) may be performed by a well-known method. Specifically, the wire rod is subjected to a lubrication treatment, and a lubricant coating as typified by a phosphate coating or a metallic soap layer is formed on the surface of the wire rod. The wire rod after the lubrication treatment is subjected to wire drawing at normal temperature. A well-known wire drawing machine may be used for the wire drawing. A wire drawing machine is equipped with dies for subjecting the wire rod to wire drawing.

[Quenching and Tempering Step (S5)]

In the quenching and tempering step (S5), the steel wire after the wire drawing step (S4) is subjected to a quenching and tempering treatment. The quenching and tempering step (S5) includes a quenching process and a tempering process. In the quenching process, first, the steel wire is heated to the $A_{c3}$ transformation point or higher. For example, the heating is performed using a high frequency induction heating apparatus or a radiant heating device. The heated steel wire is rapidly cooled. The rapid cooling method may be water cooling or may be oil cooling. By performing the quenching process, the microstructure of the steel wire is made a structure that is mainly composed of martensite.

The steel wire after the quenching process is subjected to a tempering process. The tempering temperature in the tempering process is the $A_{c1}$ transformation point or lower. The tempering temperature is, for example, 250 to 520° C. By performing the tempering process, the microstructure of the steel wire is made a structure that is mainly composed of tempered martensite. A steel wire to serve as the starting material for a damper spring is produced by the above production process.

[Damper Spring Production Step (S30)]

In the damper spring production step (S30), a damper spring is produced using the steel wire produced by the steel wire preparation step (S20). The damper spring production step (S30) includes a cold coiling step (S6), a stress relief annealing treatment step (S7), a ridding step (S8) which is performed as necessary, a V-based precipitates formation heat treatment step (S100), and a shot peening step (S9).

[Cold Coiling Step (S6)]

In the cold coiling step (S6), the steel wire produced by the steel wire preparation step (S20) is subjected to cold coiling to produce an intermediate steel material of a damper spring. The cold coiling is carried out using a well-known coiling apparatus. The coiling apparatus is equipped with, for example, a plurality of transfer roller sets, a wire guide, a plurality of coil forming tools (coiling pins), and a mandrel having a transverse section that is a semicircular shape. Each transfer roller set includes a pair of rollers that face each other. The plurality of transfer roller sets are arranged in a row. Each transfer roller set sandwiches the steel wire between the pair of rollers and conveys the steel wire in the wire guide direction. The steel wire passes through the wire guide. The steel wire that passed through the wire guide is bent in an arc shape by the plurality of coiling pins and the mandrel and thereby formed into a coil-shaped intermediate steel material.

[Stress Relief Annealing Treatment Step (S7)]

The stress relief annealing treatment step (S7) is an essential step. In the stress relief annealing treatment step (S7), an annealing treatment is performed in order to remove residual stress generated in the intermediate steel material by the cold coiling step. The treatment temperature (annealing temperature) in the annealing treatment is set to, for example, 400 to 500° C. Whilst the holding time at the annealing temperature is not particularly limited, for example the holding time is 10 to 50 minutes. After the holding time passes, the intermediate steel material is allowed to cool or is slow-cooled to normal temperature.

[Nitriding Step (S8)]

The nitriding step (S8) is an arbitrary step and is not an essential step. That is, the nitriding step may be performed or need not be performed. In a case where the nitriding step (S8) is performed, nitriding is performed on the intermediate steel material after the stress relief annealing treatment step (S7). In the nitriding, nitrogen is caused to penetrate into the outer layer of the intermediate steel material, and a nitrided layer (hardened layer) is formed at the outer layer of the intermediate steel material by solid-solution strengthening caused by solute nitrogen and precipitation strengthening caused by nitride formation.

It suffices to perform nitriding according to well-known conditions. The nitriding is performed at a treatment temperature (nitriding temperature) that is not more than the $A_{c1}$ transformation point. The nitriding temperature is, for example, 400 to 530° C. The holding time at the nitriding temperature is within the range of 1.0 hours to 5.0 hours. The atmosphere inside the furnace in which nitriding is performed is not particularly limited as long as the atmosphere is one in which the chemical potential of nitrogen becomes sufficiently high. The furnace atmosphere for nitriding, for example, may be made an atmosphere in which a gas with carburizing properties (RX gas or the like) is mixed as in the case of soft-nitriding.

[V-Based Precipitates Formation Heat Treatment Step (S100)]

The V-based precipitates formation heat treatment step (S100) is an essential step. In the V-based precipitates formation heat treatment step (S100), a heat treatment (V-based precipitates formation heat treatment) is performed on the intermediate steel material after the nitriding step (S8) if the nitriding step (S8) is performed, or on the intermediate steel material after the stress relief annealing treatment step (S7) if the nitriding step (S8) is not performed, to thereby form fine V-based precipitates in the damper spring. By performing the V-based precipitates formation heat treatment step (S100), in the damper spring, the number density of V-based precipitates having a maximum diameter ranging from 2 to 10 nm is made 5000 to 80000 pieces/$\mu m^3$.

In the V-based precipitates formation heat treatment, a heat-treatment temperature is set within a range of 540 to 650° C. A holding time t (min) at the heat-treatment temperature T (° C.) is not particularly limited, and for example is within a range of 5/60 (that is, 5 sec) to 50 minutes. The aforementioned heat-treatment temperature and holding time are adjusted to make the number density of V-based precipitates having a maximum diameter ranging from 2 to 10 nm in the damper spring 5000 to 80000 pieces/μm³.

In a case where the nitriding step (S8) is performed, the heat-treatment temperature in the V-based precipitates formation heat treatment may be higher than the nitriding temperature in the nitriding step (S8). In the conventional process for producing a damper spring, in a heat treatment (stress relief annealing treatment step or the like) after a quenching and tempering step, a heat treatment is performed at a lower temperature than the nitriding temperature in the case of performing the nitriding step (S8). This is because the conventional process for producing a damper spring is based on the technical idea that the fatigue limit is increased by maintaining the strength and hardness of the steel material constituting the damper spring at a high level. In a case where the nitriding step (S8) is performed, it is necessary to perform heating to a nitriding temperature. Therefore, in the conventional production process, a decrease in the strength of the steel material has been suppressed by, as much as possible, making a heat-treatment temperature in a heat treatment step other than nitriding less than the nitriding temperature. On the other hand, for the damper spring of the present embodiment, instead of the technical idea of increasing the fatigue limit of a damper spring by increasing the strength of the steel material, the technical idea of increasing the fatigue limit of a damper spring by formation of a large number of nano-sized fine V-based precipitates was adopted. Therefore, in the V-based precipitates formation heat treatment, the heat-treatment temperature is set to 540 to 650° C., a temperature region in which it is easy for V-based precipitates to form. A preferable lower limit of the heat-treatment temperature in the V-based precipitates formation heat treatment is 550° C., more preferably is 560° C., further preferably is 565° C., and further preferably is 570° C. A preferable upper limit of the heat-treatment temperature in the V-based precipitates formation heat treatment is 640° C., more preferably is 630° C., further preferably is 620° C., and further preferably is 610° C.

In addition, the V-based precipitates formation heat treatment is performed in a manner so that Fn defined by the following equation (1) is within the range of 29.5 to 38.9.

$$Fn = \{T^{3/2} \times \{0.6 t^{1/8} + (Cr + Mo + 2V)^{1/2}\}\}/1000 \quad (1)$$

T in equation (1) represents a heat-treatment temperature (° C.) in the V-based precipitates formation heat treatment, and t represents a holding time (min) at the heat-treatment temperature T. The content (mass %) of a corresponding element in the chemical composition of the damper spring is substituted for each symbol of an element in equation (1).

The amount of V-based precipitates that are precipitated is influenced not only by the heat-treatment temperature T (° C.) and the holding time t (min), but also by the respective contents of Cr, Mo and V that are elements which contribute to formation of V-based precipitates.

Specifically, formation of V-based precipitates is facilitated by Cr and Mo. Although the reason for this is not clear, the following reason is conceivable. In a temperature region that is lower than a temperature region in which V-based precipitates form, Cr forms Fe-based carbides such as cementite or Cr carbides. Likewise, in a temperature region that is lower than a temperature region in which V-based precipitates form, Mo forms Mo carbides ($Mo_2C$). As the temperature increases, the Fe-based carbides, Cr carbides, and Mo carbides dissolve and serve as nucleation sites for V-based precipitates. As a result, at the heat-treatment temperature T, formation of V-based precipitates is facilitated.

On the premise that the content of each element in the chemical composition of the damper spring is within the range of the present embodiment, if Fn is less than 29.5, formation of V-based precipitates will be insufficient in the V-based precipitates formation heat treatment. In this case, in the produced damper spring, the number density of V-based precipitates having a maximum diameter ranging from 2 to 10 nm will be less than 5000 pieces/μm³. On the other hand, on the premise that the content of each element in the chemical composition of the damper spring is within the range of the present embodiment, if Fn is more than 38.9, the formed V-based precipitates will coarsen. In this case, in the produced damper spring, the number density of V-based precipitates having a maximum diameter ranging from 2 to 10 nm will be less than 5000 pieces/μm³.

On the premise that the content of each element in the chemical composition of the damper spring is within the range of the present embodiment, when Fn is within the range of 29.5 to 38.9, in the produced damper spring, the number density of V-based precipitates having a maximum diameter ranging from 2 to 10 nm will be within the range of 5000 to 80000 pieces/μm³.

A preferable lower limit of Fn is 29.6, more preferably is 29.8, and further preferably is 30.0. A preferable upper limit of Fn is 38.5, more preferably is 38.0, further preferably is 37.5, further preferably is 37.0, further preferably is 36.5, further preferably is 36.0, and further preferably is 35.5.

[Shot Peening Step (S9)]

The shot peening step (S9) is an essential step. In the shot peening step (S9), shot peening is performed on the surface of the intermediate steel material after the V-based precipitates formation heat treatment step (S100). By this means, compressive residual stress is imparted to the outer layer of the damper spring, and the fatigue limit of the damper spring can be further increased. The shot peening may be performed by a well-known method. For example, blast media having a diameter of 0.01 to 1.5 mm is used for the shot peening. Well-known blast media such as steel shot or steel beads may be utilized as the blast media. The compressive residual stress imparted to the damper spring is adjusted depending on the diameter of the blast media, the shot velocity, the shot time period (duration), and the amount of blast media shot onto a unit area per unit time.

The damper spring of the present embodiment is produced by the production process described above. Note that, in the process for producing a damper spring, as mentioned above, the nitriding step (S8) may be performed or need not be performed. In short, the damper spring of the present embodiment may be subjected to nitriding, or need not be subjected to nitriding. In the damper spring of the present embodiment, the number density of V-based precipitates having a maximum diameter ranging from 2 to 10 nm is within the range of 5000 to 80000 pieces/μm³. Therefore, an excellent fatigue limit is obtained in the damper spring.

Note that, in the production process described above, in the case of performing the nitriding step (S8), the V-based precipitates formation heat treatment step (S100) is performed after the nitriding step (S8). In a case where the nitriding step (S8) is not performed, the V-based precipitates formation heat treatment step (S100) is performed after the stress relief annealing treatment step (S7). However, as long as the V-based precipitates formation heat treatment step (S100) is after the quenching process in the quenching and tempering step (S5), the V-based precipitates formation heat treatment step (S100) may be performed at any stage. For example, in the case of performing the nitriding step (S8), a production flow may be adopted in which the V-based precipitates formation heat treatment step (S100) is not performed at a stage that is after the nitriding step (S8) and before the shot peening step (S9), and instead the V-based precipitates formation heat treatment step (S100) is performed after the shot peening step (S9). Further, in the case of performing the nitriding step (S8), a production flow may be adopted in which the V-based precipitates formation heat treatment step (S100) is not performed at a stage that is after the nitriding step (S8) and before the shot peening step (S9), and instead the V-based precipitates formation heat treatment step (S100) is performed at a stage that is after the quenching and tempering step (S5) and before the cold coiling step (S6). In addition, instead of the tempering process in the quenching and tempering step (S5), the V-based precipitates formation heat treatment step (S100) may be performed after the quenching process. In this case, the V-based precipitates formation heat treatment step (S100) also serves as a tempering process. In a case where, instead of the tempering process, the V-based precipitates formation heat treatment step (S100) is performed after the quenching process, the V-based precipitates formation heat treatment step (S100) need not be performed after the nitriding step (S8).

Note that, a producer of the damper spring of the present embodiment may receive the supply of a wire rod from a third party, and perform the steel wire preparation step (S20) and the damper spring production step (S30) using the prepared wire rod. A producer of the damper spring may also receive the supply of a steel wire from a third party, and perform the damper spring production step (S30) using the prepared steel wire.

Example 1

Advantageous effects of the damper spring of the present embodiment will now be described more specifically by way of examples. The conditions adopted in the following examples are one example of conditions adopted for confirming the feasibility and advantageous effects of the damper spring of the present embodiment. Accordingly, the damper spring of the present embodiment is not limited to this one example of conditions.

Molten steels having the chemical compositions shown in Table 1 were produced.

TABLE 1

| Steel Number | Chemical Composition (unit is mass %: balance is Fe and impurities) | | | | | | | | | | | | | | | | |
|---|---|---|---|---|---|---|---|---|---|---|---|---|---|---|---|---|---|
| Type | C | Si | Mn | P | S | Cr | V | Cu | Al | Ti | N | Mo | Nb | W | Ni | Co | B |
| A | 0.62 | 2.22 | 0.75 | 0.008 | 0.009 | 1.56 | 0.33 | — | — | — | 0.0041 | — | — | — | — | — | — |
| B | 0.61 | 2.25 | 0.72 | 0.007 | 0.008 | 1.54 | 0.31 | 0.012 | 0.0013 | 0.001 | 0.0038 | — | — | — | — | — | — |
| C | 0.62 | 2.40 | 0.70 | 0.008 | 0.006 | 1.57 | 0.50 | 0.010 | 0.0010 | 0.002 | 0.0042 | — | — | — | — | — | — |
| D | 0.62 | 1.31 | 0.68 | 0.008 | 0.009 | 1.52 | 0.33 | 0.011 | 0.0009 | 0.001 | 0.0040 | — | — | — | — | — | — |
| E | 0.62 | 2.20 | 0.78 | 0.007 | 0.008 | 1.49 | 0.29 | 0.010 | 0.0009 | 0,001 | 0.0043 | 0.25 | — | — | — | — | — |
| F | 0.60 | 2.22 | 0.73 | 0.009 | 0.008 | 1 55 | 0.30 | 0.012 | 0.0011 | 0,001 | 0.0037 | — | 0.012 | — | — | — | — |
| G | 0.63 | 2.20 | 0.73 | 0.010 | 0.007 | 1.46 | 0.57 | 0.010 | 0.0012 | 0.001 | 0.0039 | — | — | 0.16 | — | — | — |
| H | 0.62 | 2.17 | 0.70 | 0.009 | 0.006 | 1.55 | 0.10 | 0.012 | 0.0008 | 0.001 | 0.0042 | — | — | — | 0.222 | — | — |
| I | 0.60 | 2.18 | 0.72 | 0.009 | 0.008 | 1.48 | 0.32 | 0.011 | 0.0009 | 0.001 | 0.0042 | — | — | — | — | 0.18 | — |
| J | 0.61 | 2.20 | 0.72 | 0.007 | 0.009 | 1.51 | 0.30 | 0.012 | 00010 | 0.001 | 0.0040 | — | — | — | — | — | 0.0042 |
| K | 0.59 | 2.08 | 0.73 | 0.007 | 0.007 | 1.89 | 0.29 | — | — | — | 0.0044 | — | — | — | — | — | — |
| L | 0.62 | 2.12 | 0.68 | 0.009 | 0.007 | 0.43 | 0.31 | — | — | — | 0.0047 | — | — | — | — | — | — |
| M | 0.62 | 2.51 | 0.67 | 0.008 | 0.006 | 1.42 | 0.30 | 0.013 | 0.0009 | 0.002 | 0.0044 | — | — | — | — | — | — |
| N | 0.62 | 2.30 | 0.69 | 0.007 | 0.009 | 1.58 | 0.03 | 0.016 | 0.0012 | 0.001 | 0.0042 | — | — | — | — | — | — |
| O | 0.51 | 2.23 | 0.72 | 0.007 | 0.008 | 1.48 | 0.32 | — | — | — | 0.0045 | — | — | — | — | — | — |
| P | 0.79 | 2.18 | 0.68 | 0.008 | 0.007 | 1.52 | 0.28 | — | — | — | 0.0039 | — | — | — | — | — | — |
| Q | 0.60 | 2.46 | 0.69 | 0.007 | 0.009 | 1 50 | 0.31 | — | — | — | 0 0042 | — | — | — | — | — | — |
| R | 0.59 | 2.20 | 0.25 | 0.009 | 0.009 | 1.49 | 0.31 | — | — | — | 0.0040 | — | — | — | — | — | — |
| S | 0.62 | 2.22 | 0.71 | 0.010 | 0.007 | 1.54 | 0.06 | — | — | — | 0.0043 | — | — | — | — | — | — |
| T | 0.60 | 2.19 | 0.73 | 0.009 | 0.007 | 1.47 | 0.59 | — | — | — | 0.0037 | — | — | — | — | — | — |

In Table 1, the "-" symbol means that the content of the corresponding element was less than the detection limit. That is, it means that the corresponding element was not contained. For example, with regard to the Nb content of Steel Type Number A, the "-" symbol means that the content was "0"% when the content was rounded off to three decimal places. In the chemical compositions of the steel type numbers listed in Table 1, the balance other than the elements listed in Table 1 was Fe and impurities. Each of the aforementioned molten steels was used to produce a bloom by a continuous casting process. After heating the bloom, the bloom was subjected to blooming that is a rough rolling process and thereafter was subjected to rolling by a continuous mill to produce a billet in which a cross section perpendicular to the longitudinal direction was 162 mm×162 mm. The heating temperature used for the blooming was 1200 to 1250° C., and the holding time at the heating temperature was 2.0 hours.

The produced billet was subjected to a finish rolling process to produce a wire rod having a diameter of 5.5 mm. The heating temperature in a reheating furnace for each test number in the finish rolling process was 1150 to 1200° C., and the holding time at the heating temperature was 1.5 hours.

The produced wire rod was subjected to a patenting treatment. The heat-treatment temperature in the patenting treatment was 650 to 700° C., and the holding time at the heat-treatment temperature was 20 minutes. The wire rod after the patenting treatment was subjected to wire drawing to produce a steel wire having a diameter of 4.0 mm. The produced steel wire was subjected to quenching. The quenching temperature was 950 to 1000° C. The steel wire that was held at the quenching temperature was subjected to water-cooling. The steel wire after quenching was subjected to tempering. The tempering temperature was 480° C. Steel wires of the respective test numbers were produced by the above process.

The produced steel wire was subjected to a damper spring production process. Hereinafter, a damper spring subjected to nitriding is referred to as a "nitrided damper spring". The nitrided damper springs were produced by the following production method. The steel wire of each test number was subjected to cold coiling under the same conditions to produce a coiled intermediate steel material. A mean diameter of coil D of the coiled intermediate steel material was 26.5 mm, and a wire diameter d of the coiled intermediate steel material was 4.0 mm. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool. The intermediate steel material after the stress relief annealing treatment was subjected to nitriding. The nitriding temperature was set to 450° C., and the holding time at the nitriding temperature was set to 5.0 hours. The intermediate steel material after nitriding was subjected to a V-based precipitates formation heat treatment. A heat-treatment temperature T (° C.), a holding time t (min), and an Fn value in the V-based precipitates formation heat treatment were as shown in Table 2. Note that, in Test Numbers 22, 24 and 25, a V-based precipitates formation heat treatment was not performed. After performing the V-based precipitates formation heat treatment, shot peening was performed under well-known conditions. First, shot peening was performed using cut wire having a diameter of 0.8 mm as the blast media. Next, shot peening was performed using steel shot having a diameter of 0.2 mm as the blast media. The shot velocity, shot time period (duration), and the amount of blast media shot onto a unit area per unit time in the respective shot peening were made the same for each test number. Nitrided damper springs were produced by the above production method.

TABLE 2

| Test Number | Steel Number Type | Coiling Possible/Not Possible | V-based Precipitates Formation Heat Treatment Process | | | Martensite Area Fraction (%) | V-based Precipitates Number Density (pieces/μm³) | Fatigue Limit (MPa) | Fatigue Limit Ratio | Remarks |
|---|---|---|---|---|---|---|---|---|---|---|
| | | | Heat-treatment Temperature T(° C.) | Holding Time t (min) | Fn | | | | | |
| 1 | A | ○ | 590 | 15 | 33.4 | 98.2 | 34568 | 1485 | 2.58 | Inventive Example |
| 2 | B | ○ | 590 | 15 | 33.1 | 98.3 | 32099 | 1495 | 2.59 | Inventive Example |
| 3 | C | ○ | 590 | 15 | 35.0 | 98.8 | 62346 | 1490 | 2.58 | Inventive Example |
| 4 | D | ○ | 590 | 15 | 33.2 | 98.5 | 25000 | 1470 | 2.55 | Inventive Example |
| 5 | E | ○ | 590 | 15 | 33.9 | 98.1 | 72222 | 1495 | 2.59 | Inventive Example |
| 6 | F | ○ | 590 | 15 | 33.1 | 98.8 | 30864 | 1490 | 2.56 | Inventive Example |
| 7 | G | ○ | 590 | 15 | 35.2 | 98.3 | 76543 | 1495 | 2.59 | Inventive Example |
| 8 | H | ○ | 590 | 15 | 31.0 | 98.0 | 15432 | 1475 | 2.55 | Inventive Example |
| 9 | I | ○ | 590 | 15 | 32.9 | 98.5 | 29630 | 1480 | 2.56 | Inventive Example |
| 10 | J | ○ | 590 | 15 | 32.9 | 98.4 | 32099 | 1480 | 2.56 | Inventive Example |
| 11 | K | ○ | 590 | 15 | 34.6 | 98.6 | 58333 | 1495 | 2.59 | Inventive Example |
| 12 | L | ○ | 615 | 35 | 29.9 | 98.1 | 16975 | 1475 | 2.57 | Inventive Example |
| 13 | A | ○ | 630 | 5 | 35.2 | 98.9 | 23765 | 1480 | 2.58 | Inventive Example |
| 14 | A | ○ | 570 | 30 | 32.8 | 983 | 32407 | 1480 | 2.57 | Inventive Example |
| 15 | O | ○ | 590 | 15 | 32.9 | 98.2 | 35494 | 1485 | 2.57 | Inventive Example |
| 16 | P | ○ | 590 | 15 | 32.7 | 98.4 | 37963 | 1485 | 2.58 | Inventive Example |
| 17 | Q | ○ | 590 | 15 | 32.9 | 98.1 | 37037 | 1480 | 2.57 | Inventive Example |
| 18 | R | ○ | 590 | 15 | 32.9 | 98.4 | 31790 | 1485 | 2.58 | Inventive Example |
| 19 | S | ○ | 590 | 15 | 30.5 | 98.3 | 19444 | 1475 | 2.57 | Inventive Example |
| 20 | T | ○ | 590 | 15 | 35.4 | 98.0 | 79012 | 1495 | 2.61 | Inventive Example |
| 21 | A | ○ | 550 | 12 | 29.8 | 98.4 | 5556 | 1470 | 2.56 | Inventive Example |
| 22 | M | X | — | — | — | — | — | — | — | Comparative Example |
| 23 | N | ○ | 590 | 15 | 30.4 | 98.7 | 4630 | 1395 | 2.38 | Comparative Example |
| 24 | A | ○ | — | — | — | 98.4 | — | 1430 | 2.19 | Comparative Example |
| 25 | B | ○ | — | — | — | 985 | — | 1435 | 2.19 | Comparative Example |
| 26 | A | ○ | 520 | 15 | 27.6 | 98.2 | — | 1435 | 2.28 | Comparative Example |
| 27 | B | ○ | 520 | 15 | 27.4 | 98.3 | — | 1440 | 2.30 | Comparative Example |
| 28 | B | ○ | 500 | 15 | 25.8 | 98.6 | — | 1440 | 2.25 | Comparative Example |
| 29 | A | ○ | 660 | 15 | 39.5 | 99.1 | 3704 | 1415 | 2.43 | Comparative Example |
| 30 | B | ○ | 660 | 15 | 39.2 | 99.0 | 3086 | 1400 | 2.52 | Comparative Example |
| 31 | A | ○ | 680 | 15 | 41.3 | 98.7 | 2778 | 1410 | 2.45 | Comparative Example |
| 32 | A | ○ | 640 | 35 | 39.3 | 99.1 | 4630 | 1415 | 2.45 | Comparative Example |
| 33 | A | ○ | 550 | 5 | 28.7 | 98.1 | 1543 | 1400 | 2.40 | Comparative Example |

[Evaluation Tests]

The produced steel wire of each test number was subjected to a cold coiling workability test. In addition, the produced nitrided damper spring of each test number was subjected to a microstructure observation test, a test to measure the number density of V-based precipitates, a Vickers hardness measurement test, and a fatigue test.

[Cold Coiling Workability Test]

Cold coiling of the steel wire of each test number was performed under the following conditions, and whether or not it was possible to perform cold coiling work was investigated. The mean diameter of coil D (=(coil inner diameter+coil outer diameter)/2) of the coiled intermediate steel material was set to 12.1 mm, and the wire diameter d of the coiled intermediate steel material was set to 4.0 mm. Whether cold coiling work was possible or not is shown in the "Coiling Possible/Not Possible" column in Table 2. The symbol "○" indicates that cold coiling work could be performed, and the symbol "x" indicates that cold coiling work could not be performed.

[Microstructure Observation Test]

The nitrided damper spring of each test number was cut in the wire diameter direction, and a test specimen was extracted. Among the surfaces of the extracted test specimen, a surface corresponding to a cross section in the wire diameter direction of the damper spring was adopted as an observation surface. After mirror-polishing the observation surface, the observation surface was subjected to etching using 2% nitric acid-alcohol (nital etching reagent). On the etched observation surface, a d/4 depth position from the surface of the damper spring was observed using an optical microscope having a magnification of 500×, and photographic images of an arbitrary five visual fields were generated. The size of each visual field was set to 100 μm×100 μm. In each visual field, the contrast differed for the respective phases of martensite, retained austenite, precipitates, inclusions and the like. Therefore, martensite was identified based on the contrast. The gross area ($\mu m^2$) of martensite identified in each visual field was determined. The proportion of the gross area of martensite in all of the visual fields relative to the gross area ($10000\ \mu m^2 \times 5$) of all the visual fields was defined as the area fraction (%) of martensite. The area fraction of martensite thus determined is shown in Table 2.

[Test to Measure Number Density of V-Based Precipitates]

The nitrided damper spring of each test number was cut in the wire diameter direction, and a disc having a surface (cross section) in the wire diameter direction and a thickness of 0.5 min was extracted. Grinding and polishing were performed from both sides of the disc using emery paper to make the thickness of the disc 50 μm. Thereafter, a sample having a diameter of 3 mm was taken from the disc. The sample was immersed in 10% perchloric acid-glacial acetic acid solution to perform electrolytic polishing, to thereby prepare a thin film sample having a thickness of 100 nm.

The prepared thin film sample was observed using a TEM. Specifically, first, analysis of Kikuchi lines was performed with respect to the thin film sample to identify the crystal orientation of the thin film sample. Next, the thin film sample was tilted based on the identified crystal orientation, and the thin film sample was set so that the (001) plane in ferrite (body-centered cubic lattice) could be observed. Specifically, the thin film sample was inserted into the TEM, and Kikuchi lines were observed. Tilting of the thin film sample was adjusted so that a [001] direction of ferrite in the Kikuchi lines matched the incident direction of an electron beam. After adjustment, when the actual image was observed, the observation was from a vertical direction to the (001) plane in ferrite. After setting the thin film sample, observation visual fields at an arbitrary four locations of the thin film sample were identified. Each observation visual field was observed using an observation magnification of 200000× and an accelerating voltage of 200 kV. The observation visual field was set to 0.09 μm×0.09 μm.

As mentioned above, V-based precipitates precipitate in a plate shape along a {001} plane in ferrite. In ferrite grains on the (001) plane, V-based precipitates are observed as line segments (edge portions) extending linearly with respect to the [100] orientation or [010] orientation. In a TEM image, precipitates are shown with a contrast of a different brightness compared to the parent phase. Therefore, in a TEM image of a (001) plane in ferrite, line segments extending along the [100] orientation or [010] orientation were regarded as V-based precipitates. The length of the line segment of the respective V-based precipitates identified in each of the observation visual fields was measured, and the measured length of the line segment was defined as the maximum diameter (nm) of the relevant V-based precipitate.

The total number of V-based precipitates having a maximum diameter ranging from 2 to 10 nm in the observation visual fields at the four locations was determined by the aforementioned measurement. The number density of V-based precipitates having a maximum diameter ranging from 2 to 10 nm (pieces/$\mu m^3$) was determined based on the determined total number of V-based precipitates and the total volume of the observation visual fields at the four locations. The determined number density of V-based precipitates is shown in the "V-based Precipitates Number Density (pieces/$\mu m^3$)" column in Table 2. The symbol "-" in the "V-based Precipitates Number Density (pieces/$\mu m^3$)" column means that the number density of V-based precipitates was 0 pieces/$m^3$.

[Vickers Hardness Measurement Test]

The hardness of the core portion of the nitrided damper spring of each test number was determined by a Vickers hardness measurement test. Specifically, a Vickers hardness measurement test in conformity with JIS Z 2244 (2009) was performed at an arbitrary three locations at a d/4 position of a cross section in the wire diameter direction of the nitrided damper spring of each test number. The test force was set to 0.49 N. The arithmetic mean value of the obtained Vickers hardness values at the three locations was adopted as the Vickers hardness of the core portion of the nitrided damper spring of the relevant test number.

[Fatigue Test]

A fatigue test described hereunder was conducted using the nitrided damper spring of each test number. For the fatigue test, a compressive fatigue test was conducted in which a repeated load was applied in the direction of the central axis of the coiled nitrided damper springs. An electro-hydraulic servo type fatigue tester (load capacity 500 kN) was used as the testing machine.

As the test conditions, a stress ratio of 0.2 was set as the load, and the frequency was set from 1 to 3 Hz. The test was performed until the nitrided damper spring fractured, with a cycle count of $10^7$ cycles set as the upper limit. If the damper spring did not fracture before reaching $10^7$ cycles, the test was stopped at $10^7$ cycles and it was determined that the result of the test was "non-fracture". Here, the maximum value of the test stress when the damper spring was non-fracture at $10^7$ cycles was defined as "$F_M$", and the minimum value of the test stress when the damper spring fractured before reaching $10^7$ cycles at not less than $F_M$ was defined as "$F_B$". The arithmetic mean value of $F_M$ and $F_B$ was defined as "$F_A$", and the value of $F_A$ in a case where $(F_B-F_M)/F_A \leq 0.10$ was defined as the fatigue limit (MPa). On the other hand, in a case where all the damper springs fractured as a result of undergoing the test, that is, in a case where $F_M$ could not be obtained, a test stress corresponding to a life of $10^7$ cycles was extrapolated based on the relation between the fracture life and the test stress, and the obtained test stress was defined as the fatigue limit (MPa). Here, the test stress corresponded to the surface stress amplitude at the fracture position. A fatigue limit (MPa) was determined for the nitrided damper springs of each test number based on the aforementioned definitions and the evaluation tests. In addition, the obtained fatigue limit and Vickers hardness of core portion were used to determine a fatigue limit ratio (=fatigue limit/Vickers hardness of core portion) of the nitrided damper spring.

[Test Results]

The test results are shown in Table 2. Referring to Table 2, in Test Numbers 1 to 21, the chemical composition was appropriate and the production process was also appropriate. Therefore, the steel wire of each test number was excellent in workability in cold coiling. Further, in the microstructure of the nitrided damper spring of each test number, the martensite area fraction was 90.0% or more. In addition, in each of these test numbers, the number density of V-based precipitates having a maximum diameter ranging from 2 to 10 nm was 5000 to 80000 pieces/μm$^3$. Therefore, the fatigue limit of the nitrided damper spring was 1470 MPa or more, and the fatigue limit ratio (=fatigue limit/Vickers hardness of core portion) of the nitrided damper spring was 2.55 or more.

On the other hand, in Test Number 22, the Si content was too high. Therefore, the workability in cold coiling was low.

In Test Number 23, the V content was too low. Therefore, the number density of V-based precipitates having a maximum diameter ranging from 2 to 10 nm was too low. Consequently, the fatigue limit was less than 1470 MPa, and the fatigue limit ratio was less than 2.55.

In Test Number 24 and 25, although the chemical composition was appropriate, the V-based precipitates formation heat treatment was not performed. Therefore, the number density of V-based precipitates having a maximum diameter ranging from 2 to 10 nm was too low. Consequently, the fatigue limit was less than 1470 MPa, and the fatigue limit ratio was less than 2.55.

In Test Numbers 26 to 28, although the chemical composition was appropriate, the heat-treatment temperature in the V-based precipitates formation heat treatment was too low. Therefore, the number density of V-based precipitates having a maximum diameter ranging from 2 to 10 nm was too low. Consequently, the fatigue limit was less than 1470 MPa, and the fatigue limit ratio was less than 2.55.

In Test Number 29 to 31, although the chemical composition was appropriate, the heat-treatment temperature in the V-based precipitates formation heat treatment was too high. Therefore, V-based precipitates coarsened and the number density of V-based precipitates having a maximum diameter ranging from 2 to 10 nm was too low. As a result, the fatigue limit was less than 1470 MPa, and the fatigue limit ratio was less than 2.55.

In Test Number 32, although the chemical composition was appropriate, in the V-based precipitates formation heat treatment, Fn defined by equation (1) was more than 38.9. As a result, the number density of V-based precipitates having a maximum diameter ranging from 2 to 10 nm was too low. Consequently, the fatigue limit was less than 1470 MPa, and the fatigue limit ratio was less than 2.55.

In Test Number 33, although the chemical composition was appropriate, in the V-based precipitates formation heat treatment, Fn defined by equation (1) was less than 29.5. As a result, the number density of V-based precipitates having a maximum diameter ranging from 2 to 10 nm was too low. Consequently, the fatigue limit was less than 1470 MPa, and the fatigue limit ratio was less than 2.55.

Example 2

Steel wires were produced using molten steels having the chemical compositions shown in Table 1 by the same method as the method used in Example 1. The produced steel wires were used to produce damper springs not subjected to nitriding. Hereinafter, a damper spring not subjected to nitriding is referred to as a "non-nitrided damper spring".

The non-nitrided damper springs were produced by the following production method. The steel wire of each test number was subjected to cold coiling under the same conditions as the conditions adopted for the nitrided damper springs of Example 1, to thereby produce a coiled intermediate steel material. A mean diameter of coil D of the coiled intermediate steel material was 26.5 mm, and a wire diameter d of the coiled intermediate steel material was 4.0 mm. A stress relief annealing treatment was performed on the intermediate steel material. The annealing temperature in the stress relief annealing treatment was 450° C., and the holding time at the annealing temperature was 20 minutes. After the holding time elapsed, the intermediate steel material was allowed to cool. The intermediate steel material after the stress relief annealing treatment was subjected to a V-based precipitates formation heat treatment, and was not subjected to nitriding. A heat-treatment temperature T (° C.), a holding time t (min), and an Fn value in the V-based precipitates formation heat treatment were as shown in Table 3. Note that, in Test Numbers 22, 24 and 25, a V-based precipitates formation heat treatment was not performed. After performing the V-based precipitates formation heat treatment, shot peening was performed under the same conditions as the conditions adopted for the nitrided damper springs of Example 1. Non-nitrided damper springs were produced by the above production method.

TABLE 3

| | | | V-based Precipitates Formation Heat Treatment Process | | | | V-based | | | |
|---|---|---|---|---|---|---|---|---|---|---|
| Test Number | Steel Type Number | Coiling Possible/Not Possible | Heat-treatment Temperature T(° C.) | Holding Time t (min) | Fn | Martensite Area Fraction (%) | Precipitates Number Density (pieces/μm$^3$) | Fatigue Limit (MPa) | Fatigue Limit Ratio | Remarks |
| 1 | A | ○ | 590 | 15 | 33.4 | 98.2 | 34568 | 1435 | 2.48 | Inventive Example |
| 2 | B | ○ | 590 | 15 | 33.1 | 98.3 | 32099 | 1440 | 2.48 | Inventive Example |
| 3 | C | ○ | 590 | 15 | 35.0 | 98.8 | 62346 | 1445 | 2.49 | Inventive Example |
| 4 | D | ○ | 590 | 15 | 33.2 | 98.5 | 25000 | 1425 | 2.47 | Inventive Example |
| 5 | E | ○ | 590 | 15 | 33.9 | 98.1 | 72222 | 1445 | 2.49 | Inventive Example |
| 6 | F | ○ | 590 | 15 | 33.1 | 98.8 | 30864 | 1435 | 2.47 | Inventive Example |
| 7 | G | ○ | 590 | 15 | 35.2 | 98.3 | 76543 | 1445 | 2.49 | Inventive Example |
| 8 | H | ○ | 590 | 15 | 31.0 | 98.0 | 15432 | 1420 | 2.46 | Inventive Example |
| 9 | I | ○ | 590 | 15 | 32.9 | 98.5 | 29630 | 1440 | 2.48 | Inventive Example |
| 10 | J | ○ | 590 | 15 | 32.9 | 98.4 | 32099 | 1440 | 2.47 | Inventive Example |
| 11 | K | ○ | 590 | 15 | 34.6 | 98.6 | 58333 | 1445 | 2.49 | Inventive Example |
| 12 | L | ○ | 615 | 35 | 29.9 | 98.1 | 16975 | 1430 | 2.47 | Inventive Example |
| 13 | A | ○ | 630 | 5 | 35.2 | 98.9 | 23765 | 1440 | 2.48 | Inventive Example |
| 14 | A | ○ | 570 | 30 | 32.8 | 98.3 | 32407 | 1435 | 2.46 | Inventive Example |

TABLE 3-continued

| | | | V-based Precipitates Formation Heat Treatment Process | | | | V-based | | | |
| --- | --- | --- | --- | --- | --- | --- | --- | --- | --- | --- |
| Test Number | Steel Type Number | Coiling Possible/Not Possible | Heat-treatment Temperature T(° C.) | Holding Time t (min) | Fn | Martensite Area Fraction (%) | Precipitates Number Density (pieces/μm³) | Fatigue Limit (MPa) | Fatigue Limit Ratio | Remarks |
| 15 | O | ○ | 590 | 15 | 32.9 | 98.2 | 35494 | 1435 | 2.48 | Inventive Example |
| 16 | P | ○ | 590 | 15 | 32.7 | 98.4 | 37963 | 1435 | 2.47 | Inventive Example |
| 17 | Q | ○ | 590 | 15 | 32.9 | 98.1 | 37037 | 1430 | 2.48 | Inventive Example |
| 18 | R | ○ | 590 | 15 | 32.9 | 98.4 | 31790 | 1435 | 2.47 | Inventive Example |
| 19 | S | ○ | 590 | 15 | 30.5 | 98.3 | 19444 | 1425 | 2.46 | Inventive Example |
| 20 | T | ○ | 590 | 15 | 35.4 | 98.0 | 79012 | 1445 | 2.48 | Inventive Example |
| 21 | A | ○ | 550 | 12 | 29 8 | 98.4 | 5556 | 1420 | 2.46 | Inventive Example |
| 22 | K | X | — | — | — | — | — | — | — | Comparative Example |
| 23 | L | ○ | 590 | 15 | 30.4 | 98.7 | 4630 | 1360 | 2.32 | Comparative Example |
| 24 | A | ○ | — | — | — | 98.4 | — | 1390 | 2.18 | Comparative Example |
| 25 | B | ○ | — | — | — | 98.5 | — | 1390 | 2.15 | Comparative Example |
| 26 | A | ○ | 520 | 15 | 27.6 | 98.2 | — | 1395 | 2 26 | Comparative Example |
| 27 | B | ○ | 520 | 15 | 27.4 | 98.3 | — | 1400 | 2 26 | Comparative Example |
| 28 | B | ○ | 500 | 15 | 25.8 | 98.6 | — | 1395 | 2.21 | Comparative Example |
| 29 | A | ○ | 660 | 15 | 39.5 | 99.1 | 3704 | 1360 | 2.41 | Comparative Example |
| 30 | B | ○ | 660 | 15 | 39.2 | 99.0 | 3086 | 1365 | 2.43 | Comparative Example |
| 31 | A | ○ | 680 | 15 | 41.3 | 98.7 | 2778 | 1410 | 2.45 | Comparative Example |
| 32 | A | ○ | 640 | 35 | 39.3 | 99.1 | 4630 | 1375 | 2.41 | Comparative Example |
| 33 | A | ○ | 550 | 5 | 28.7 | 98.1 | 1543 | 1360 | 2.30 | Comparative Example |

[Evaluation Tests]

The produced steel wire of each test number was subjected to a cold coiling workability test. In addition, the produced non-nitrified damper spring of each test number were subjected to a microstructure observation test, a test to measure the number density of V-based precipitates, a Vickers hardness measurement test, and a fatigue test.

[Cold Coiling Workability Test]

Cold coiling of the steel wire of each test number was performed under the following conditions, and whether or not it was possible to perform cold coiling work was investigated. The mean diameter of coil D (=(coil inner diameter+coil outer diameter)/2) of the coiled intermediate steel material was set to 12.1 mm, and the wire diameter d of the coiled intermediate steel material was set to 4.0 mm. Whether cold coiling work was possible or not is shown in the "Coiling Possible/Not Possible" column in Table 2. The symbol "○" indicates that cold coiling work could be performed, and the symbol "x" indicates that cold coiling work could not be performed.

[Microstructure Observation Test]

The martensite area fraction of the non-nitrided damper spring of each test number was determined by the same method as the method adopted in the microstructure observation test conducted in Example 1. The area fraction of martensite of the non-nitrided damper spring of each test number thus determined is shown in Table 3.

[Test to Measure Number Density of V-Based Precipitates]

The number density of V-based precipitates in the non-nitrided damper spring of each test number was measured by the same method as the method used in the test to measure the number density of V-based precipitates conducted in Example 1. Specifically, the non-nitrided damper spring of each test number was cut in the wire diameter direction, and a disc having a surface (cross section) in the wire diameter direction and a thickness of 0.5 mm was extracted. Grinding and polishing were performed from both sides of the disc using emery paper to make the thickness of the disc 50 μm. Thereafter, a sample having a diameter of 3 mm was taken from the disc. The sample was immersed in 10% perchloric acid-glacial acetic acid solution to perform electrolytic polishing, to thereby prepare a thin film sample having a thickness of 100 nm.

The prepared thin film sample was used to determine the number density of V-based precipitates having a maximum diameter ranging from 2 to 10 nm (pieces/μm³) by the same method as the method used in Example 1. The number density of V-based precipitates in the non-nitrided damper spring of each test number thus determined is shown in Table 3. The symbol "-" in the "V-based Precipitates Number Density (pieces/μm³)" column means that the number density of V-based precipitates was 0 pieces/μm³.

[Vickers Hardness Measurement Test]

The hardness of the non-nitrided damper spring of each test number was determined by a Vickers hardness test using the same method as the method used to determine the hardness of the nitrided damper springs in Example 1. Specifically, a Vickers hardness measurement test in conformity with JIS Z 2244 (2009) was performed at an arbitrary three locations at a d/4 position of a cross section in the wire diameter direction of the non-nitrided damper spring of each test number. The test force was set to 0.49 N. The arithmetic mean value of the obtained Vickers hardness values at the three locations was adopted as the Vickers hardness of the non-nitrided damper spring of the relevant test number.

[Fatigue Test]

A fatigue test described hereunder was conducted using the non-nitrided damper spring of each test number. For the fatigue test, a compressive fatigue test was conducted in which a repeated load was applied in the direction of the central axis of the coiled non-nitrided damper spring. An electro-hydraulic servo type fatigue tester (load capacity 500 kN) was used as the testing machine. The fatigue limit (MPa) was determined for the damper spring of each test number using the same test conditions as the conditions adopted in the fatigue test of the nitrided damper springs in Example 1. In addition, the obtained fatigue limit and Vickers hardness were used to determine a fatigue limit ratio (=fatigue limit/Vickers hardness) of the respective non-nitrided damper springs.

[Test Results]

The test results are shown in Table 3. Referring to Table 3, in Test Numbers 1 to 21, the chemical composition was appropriate and the production process was also appropriate. Therefore, the steel wire of each test number was excellent in workability in cold coiling. Further, in the microstructure of the non-nitrided damper spring of each test number, the martensite area fraction was 90.0% or more. In addition, in each of these test numbers, the number density of V-based precipitates having a maximum diameter ranging from 2 to 10 nm was 5000 to 80000 pieces/μm³. Therefore, the fatigue limit of the non-nitrided damper spring was 1420 MPa or more, and the fatigue limit ratio (=fatigue limit/Vickers hardness) of the non-nitrided damper spring was 2.46 or more.

On the other hand, in Test Number 22, the Si content was too high. Therefore, the workability in cold coiling was low.

In Test Number 23, the V content was too low. Therefore, the number density of V-based precipitates having a maximum diameter ranging from 2 to 10 nm was too low. Consequently, the fatigue limit was less than 1420 MPa, and the fatigue limit ratio was less than 2.46.

In Test Numbers 24 and 25, although the chemical composition was appropriate, the V-based precipitates formation heat treatment was not performed. Therefore, the number density of V-based precipitates having a maximum diameter ranging from 2 to 10 nm was too low. Consequently, the fatigue limit was less than 1420 MPa, and the fatigue limit ratio was less than 2.46.

In Test Numbers 26 to 28, although the chemical composition was appropriate, the heat-treatment temperature in the V-based precipitates formation heat treatment was too low. Therefore, the number density of V-based precipitates having a maximum diameter ranging from 2 to 10 nm was too low. Consequently, the fatigue limit was less than 1420 MPa, and the fatigue limit ratio was less than 2.46.

In Test Numbers 29 to 31, although the chemical composition was appropriate, the heat-treatment temperature in the V-based precipitates formation heat treatment was too high. Therefore, V-based precipitates coarsened and the number density of V-based precipitates having a maximum diameter ranging from 2 to 10 nm was too low. Consequently, the fatigue limit was less than 1420 MPa, and the fatigue limit ratio was less than 2.46.

In Test Number 32, although the chemical composition was appropriate, in the V-based precipitates formation heat treatment, Fn defined by equation (1) was more than 38.9. As a result, the number density of V-based precipitates having a maximum diameter ranging from 2 to 10 nm was too low. Consequently, the fatigue limit was less than 1420 MPa, and the fatigue limit ratio was less than 2.46.

In Test Number 33, although the chemical composition was appropriate, in the V-based precipitates formation heat treatment, Fn defined by equation (1) was less than 29.5. As a result, the number density of V-based precipitates having a maximum diameter ranging from 2 to 10 nm was too low. As a result, the fatigue limit was less than 1420 MPa, and the fatigue limit ratio was less than 2.46.

Embodiments of the present invention have been described above. However, the foregoing embodiments are merely examples for implementing the present invention. Accordingly, the present invention is not limited to the above embodiments, and the above embodiments can be appropriately modified and implemented within a range that does not deviate from the gist of the present invention.

The invention claimed is:

1. A damper spring, wherein:
when a wire diameter is defined as d (mm), a chemical composition at a d/4 depth position from a surface contains, in mass %,
C: 0.50 to 0.80%,
Si: 1.20 to less than 2.50%,
Mn: 0.25 to 1.00%,
P: 0.020% or less,
S: 0.020% or less,
Cr: 0.40 to 1.90%,
V: 0.05 to 0.60%,
N: 0.0100% or less,
Mo: 0 to 0.50%,
Nb: 0 to 0.050%,
W: 0 to 0.60%,
Ni: 0 to 0.500%,
Co: 0 to 0.30%,
B: 0 to 0.0050%,
Cu: 0 to 0.050%,
Al: 0 to 0.0050%, and
Ti: 0 to 0.050%,
with the balance being Fe and impurities,
and wherein:
in a microstructure of the damper spring, an area fraction of martensite is 90.0% or more, and
a number density of V-based precipitates having a maximum diameter ranging from 2 to 10 nm is 5000 to 80000 pieces/μm³.

2. The damper spring according to claim 1, wherein:
the chemical composition contains one or more types of element selected from the group consisting of:
Mo: 0.01 to 0.50%,
Nb: 0.001 to 0.050%,
W: 0.01 to 0.60%,
Ni: 0.001 to 0.500%,
Co: 0.01 to 0.30%, and
B: 0.0001 to 0.0050%.

3. The damper spring according to claim 2, wherein:
the chemical composition contains one or more types of element selected from the group consisting of:
Cu: 0.001 to 0.050%,
Al: 0.0001 to 0.0050%, and
Ti: 0.001 to 0.050%.

4. The damper spring according to claim 1, wherein:
the chemical composition contains one or more types of element selected from the group consisting of:
Cu: 0.001 to 0.050%,
Al: 0.0001 to 0.0050%, and
Ti: 0.001 to 0.050%.

* * * * *